US007584008B2

(12) United States Patent
Kondo et al.

(10) Patent No.: US 7,584,008 B2
(45) Date of Patent: *Sep. 1, 2009

(54) DIGITAL SIGNAL PROCESSING METHOD, LEARNING METHOD, APPARATUSES FOR THEM, AND PROGRAM STORAGE MEDIUM

(75) Inventors: Tetsujiro Kondo, Tokyo (JP); Tsutomu Watanabe, Kanagawa (JP); Hiroto Kimura, Tokyo (JP)

(73) Assignee: Sony Corporation, Tokyo (JP)

( * ) Notice: Subject to any disclaimer, the term of this patent is extended or adjusted under 35 U.S.C. 154(b) by 1150 days.

This patent is subject to a terminal disclaimer.

(21) Appl. No.: 10/089,389

(22) PCT Filed: Jul. 31, 2001

(86) PCT No.: PCT/JP01/06593

§ 371 (c)(1), (2), (4) Date: Mar. 29, 2002

(87) PCT Pub. No.: WO02/13180

PCT Pub. Date: Feb. 14, 2002

(65) Prior Publication Data

US 2005/0075743 A1 Apr. 7, 2005

(30) Foreign Application Priority Data

Aug. 2, 2000 (JP) ............................ 2000-238894

(51) Int. Cl.
*G06F 17/00* (2006.01)

(52) U.S. Cl. ........................................................ 700/94

(58) Field of Classification Search .................. 700/94; 706/16; 704/233, 242; 348/571; 375/240.01-240.29
See application file for complete search history.

(56) References Cited

U.S. PATENT DOCUMENTS

| | | | | |
|---|---|---|---|---|
| 5,555,465 | A | 9/1996 | Kondo | |
| 5,739,873 | A | 4/1998 | Kondo | |
| 5,754,681 | A * | 5/1998 | Watanabe et al. | 382/159 |
| 5,764,305 | A | 6/1998 | Kondo | |
| 5,903,866 | A | 5/1999 | Shoham | |
| 6,658,155 | B1 * | 12/2003 | Kondo et al. | 382/238 |
| 6,842,733 | B1 * | 1/2005 | Gao et al. | 704/224 |
| 6,907,413 | B2 * | 6/2005 | Kondo et al. | 706/16 |

FOREIGN PATENT DOCUMENTS

| | | |
|---|---|---|
| EP | 0865028 | 9/1998 |
| EP | 0912045 | 4/1999 |
| JP | 04-115628 | 4/1992 |
| JP | 05-297898 | 11/1993 |
| JP | 05-323999 | 12/1993 |
| JP | 06-051800 | 2/1994 |

(Continued)

*Primary Examiner*—Curtis Kuntz
*Assistant Examiner*—Andrew C Flanders
(74) *Attorney, Agent, or Firm*—Frommer Lawrence & Haug LLP; William S. Frommer; Thomas F. Presson

(57) ABSTRACT

An input digital signal D10 is class-classified according to the envelope of the input digital signal D10, and the input digital signal D10 is converted by the prediction method corresponding to the class, so that conversion further suited to the feature of the input digital signal can be performed.

24 Claims, 14 Drawing Sheets

FOREIGN PATENT DOCUMENTS

| | | |
|---|---|---|
| JP | 7 67031 | 3/1995 |
| JP | 7 193789 | 7/1995 |
| JP | 8 275119 | 10/1996 |
| JP | 10-313251 | 11/1998 |
| JP | 11-027564 | 1/1999 |
| JP | 2000-32402 | 1/2000 |
| JP | 2000-78534 | 3/2000 |
| JP | 2002 49383 | 2/2002 |
| JP | 2002 49384 | 2/2002 |
| JP | 2002 49395 | 2/2002 |
| JP | 2002 49396 | 2/2002 |
| JP | 2002 49397 | 2/2002 |
| JP | 2002 49400 | 2/2002 |
| WO | WO 98/51072 | 11/1998 |

* cited by examiner

DIGITAL SIGNAL PROCESSING METHOD, LEARNING METHOD, APPARATUSES FOR THEM, AND PROGRAM STORAGE MEDIUM

TECHNICAL FIELD

The present invention relates to digital-signal processing methods and learning methods and apparatuses therefor, and program storage media, and is suitably applied to digital-signal processing methods and learning methods and apparatuses therefor, and program storage media, for applying data interpolation processing to a digital signal in a rate converter, a PCM (pulse code modulation) decoding apparatus, or others.

BACKGROUND ART

Oversampling processing, which converts the original sampling frequency to its multiple, is conventionally applied to a digital audio signal before the signal is input to a digital/analog converter. With this processing, in a digital audio signal output from the digital/analog converter, the phase characteristic of an analog anti-alias filter is maintained at a constant level in a higher-frequency zone of audible frequencies, and the effect of image noise in a digital system caused by sampling is eliminated.

In such oversampling processing, a digital filter of a linear (straight line) interpolation method is usually used. If the sampling rate is changed, or data is missing, such a digital filter obtains the average of a plurality of existing data to generate linear interpolation data.

A digital audio signal obtained after oversampling processing has a several-times-larger amount of data in the time domain due to linear interpolation, but its frequency band is not largely changed from that obtained before the conversion and its sound quality is not improved. In addition, since interpolation data is not necessarily generated according to the waveform of the analog audio signal obtained before the A/D conversion, waveform reproducibility is little improved.

When a digital audio signal having a different sampling frequency is dubbed, a sampling-rate converter is used to convert the frequency. Even in such a case, only linear data interpolation is performed by a linear digital filter, and it is difficult to improve sound quality and waveform reproducibility. In addition, the situation is the same when a data sample of a digital audio signal is missing.

DESCRIPTION OF THE INVENTION

The present invention has been made in consideration of the foregoing points. An object of the present invention is to propose a digital-signal processing method, a learning method, apparatuses therefor, and a program storage medium which can further improve the waveform reproducibility of a digital signal.

To solve the foregoing drawbacks, the class of an input digital signal is determined according to the envelope of the input digital signal, and the input digital signal is converted by the prediction method corresponding to the determined class in the present invention. Therefore, conversion further suited to a feature of the input digital signal is applied.

BEST MODE FOR CARRYING OUT THE INVENTION

Figure 1:
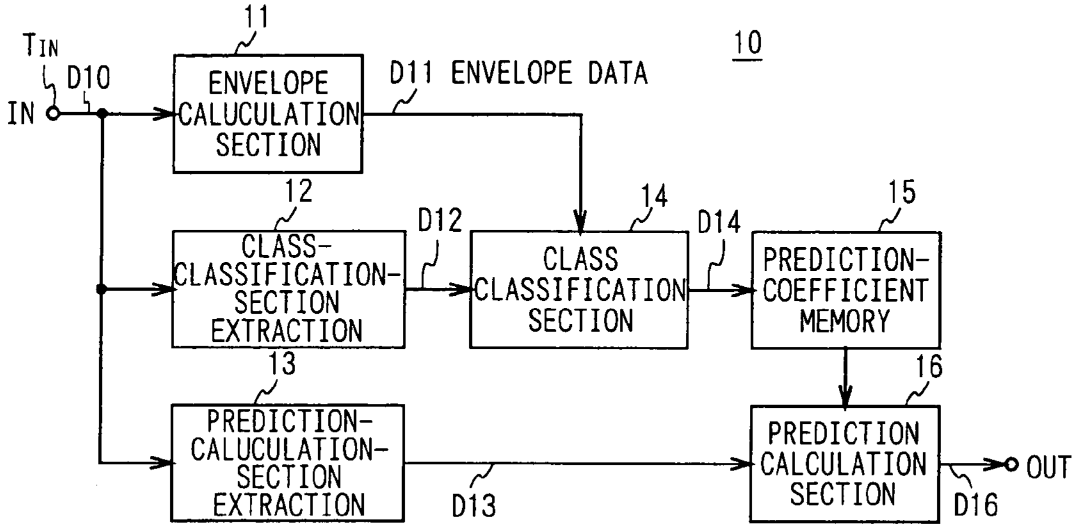
FIG. 1 is a block diagram of a digital-signal processing apparatus according to a first embodiment of the present invention.

Embodiments of the present invention will be described below in detail by referring to the drawings.

(1) First Embodiment

In FIG. 1, an audio-signal processing apparatus 10 increases a sampling rate for a digital audio signal (hereinafter called audio data), and generates, when the audio data is interpolated, audio data closed to true values by class-classification adaptive processing. The digital audio signal includes an audio signal indicating voice uttered by human being or sound made by animals, a musical-piece signal indicating a musical piece, made by an instrument, and a signal indicating other sound.

Specifically, in the audio-signal processing apparatus 10, an envelope calculation section 11 divides input audio data D10 shown in FIG. 2(A), input from an input terminal $T_{IN}$ into portions each corresponding to a predetermined time (for example, corresponding to six samples in the present embodiment), and calculates the envelope of a divided waveform for each time zone by an envelope calculation method, described later.

Figure 2:
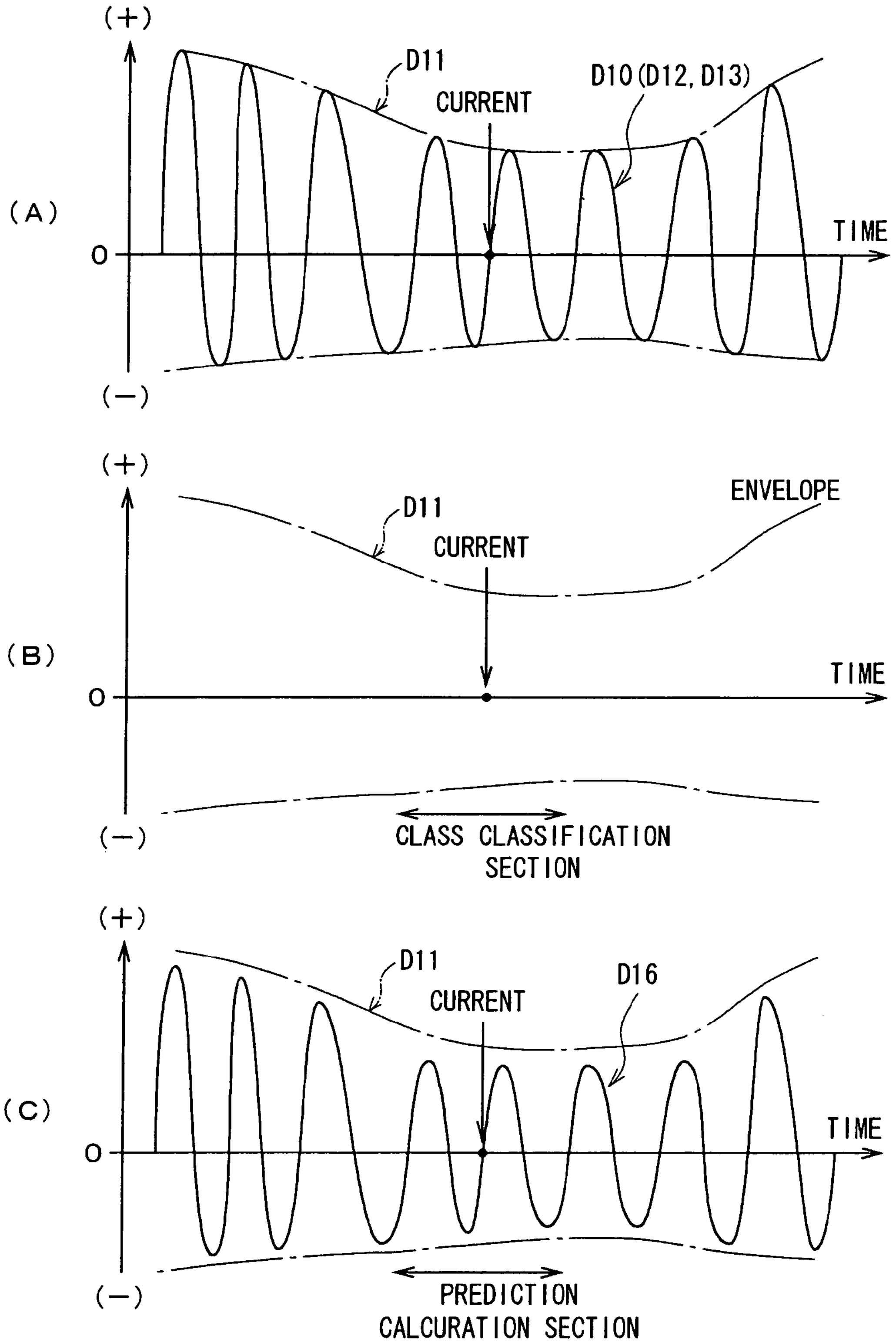
FIG. 2 is a signal waveform view used for describing class-classification adaptive processing using an envelope.

The envelope calculation section 11 sends the results of envelope calculation for the divided time zones of the input audio data D10 to a class classification section 14 as the envelope waveform data D11 (shown in FIG. 2(B)) of the input audio data D10.

A class-classification-section extracting section 12 divides the input audio data D10 shown in FIG. 2(A), input from the input terminal $T_{IN}$ into portions each corresponding to the same time zone (for example, corresponding to six samples in the present embodiment) as that used by the envelope calculation section 11, to extract audio waveform data D12 to be class-classified, and sends it to the class classification section 14.

The class classification section 14 has an ADRC (adaptive dynamic range coding) circuit section for compressing the envelope waveform data D11 corresponding to the audio waveform data D12 extracted by the class-classification-section extracting section 12, to generate a compression data pattern, and a class-code generating circuit section for generating a class code to which the envelope waveform data D11 belongs.

The ADRC circuit section applies calculation such as that for compressing eight bits to two bits to the envelope waveform data D11 to generate pattern compression data. The ADRC circuit section performs adaptive quantization. Since the circuit can efficiently express a local pattern of a signal level with a short-length word, it is used for generating codes for class classification of signal patterns.

Specifically, when six sets of eight-bit data (envelope waveform data) on the envelope waveform are class-classified, it is necessary to classify into a number of classes as huge as $2^{48}$, and a heavy load is imposed on the circuits. Therefore, the class classification section 14 of the present embodiment performs class classification according to the pattern compression data generated by the ADRC circuit section provided therein. When one-bit quantization is applied to the six sets of envelope waveform data, for example, the six sets of envelope waveform data can be expressed by six bits, and the data can be classified into $2^6=64$ classes.

When the dynamic range of the envelope within the extracted zone is indicated by DR, the number of assigned bits is indicated by m, the data level of each set of envelope waveform data is indicated by L, and a quantization code is indicated by Q, the ADRC circuit section divides according to the following expression $$DR=\mathrm{MAX}-\mathrm{MIN}+1$$

$$Q=\{(L-\mathrm{MIN}+0.5)\times 2^m/DR\} \tag{1}$$

a region between the maximum value MAX and the minimum value MIN in the zone by a specified bit length equally to perform quantization. In the expression (1), { } indicates that the result is rounded off at the decimal point. When the six sets of waveform data on the envelope calculated by the envelope calculation section 11 are each formed of eight bits (m=8), for example, each set of data is compressed to two bits in the ADRC circuit section.

When each envelope waveform data compressed in this way is indicated by $q_n$ (n=1 to 6), the class-code generating circuit section provided for the class classification section 14 performs calculation specified by the following expression according to the compressed envelope waveform data $q_n$ $$\text{class} = \sum_{i=1}^{n} q_i (2^P)^i \tag{2}$$

to calculate the class code "class" indicating a class to which the block ($q_1$ to $q_6$) belongs, and sends the class-code data D14 indicating the calculated class code "class" to a prediction-coefficient memory 15. This class code "class" indicates a reading address where prediction coefficients are read from the prediction-coefficient memory 15. In the expression (2), "n" indicates the number of compressed envelope waveform data $q_n$, which is six in the present embodiment, and "P" indicates the number of assigned bits, which is two in the present embodiment.

As described above, the class classification section 14 generates the class-code data D14 of the envelope waveform data D11 corresponding to the audio waveform data D12 extracted from the input audio data D10 by the class-classification-section extracting section 12, and sends it to the prediction-coefficient memory 15.

The prediction-coefficient memory 15 stores the prediction-coefficient set corresponding to each class code at the address corresponding to the class code. According to the class-code data D14 sent from the class classification section 14, the prediction-coefficient set $w_1$ to $w_n$ stored at the address corresponding to the class code is read, and sent to a prediction calculation section 16.

The prediction calculation section 16 applies a sum-of-products calculation indicated by the following expression to the prediction-coefficient set $w_1$ to $w_n$ and to audio waveform data (prediction tap) D13 ($x_1$ to $x_n$) which is extracted from the input audio data D10 in the time domain by a prediction-calculation-section extracting section 13 and for which prediction calculation is to be performed $$y'=w_1x_1+w_2x_2+\ldots+w_nx_n \tag{3}$$

to obtain a prediction result y'. This predication value y' is output from the prediction calculation section 16 as audio data D16 (FIG. 2(C)) in which sound quality has been improved.

Figure 3:
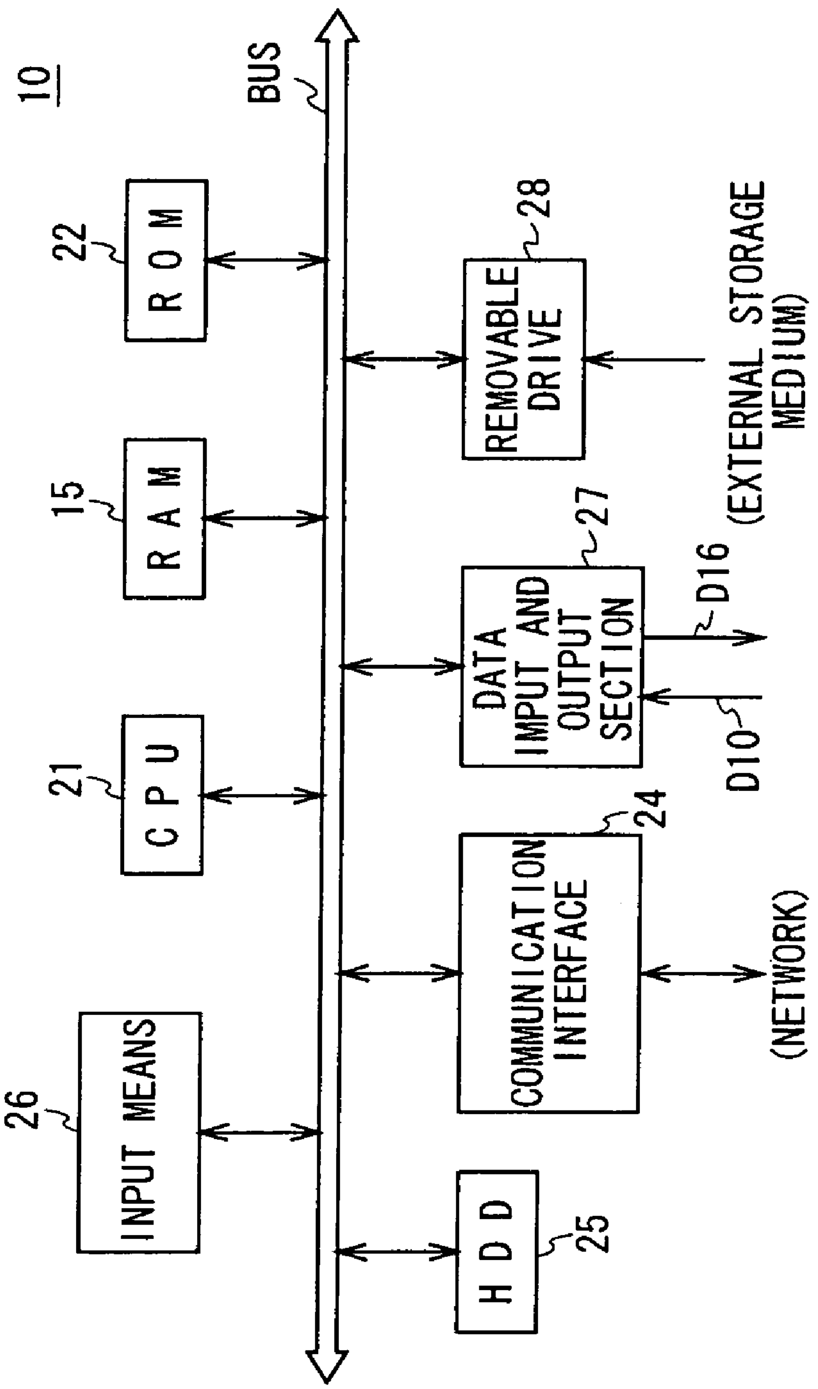
FIG. 3 is a block diagram showing the structure of an audio-signal processing apparatus.

The above-described functional blocks have been shown by referring to FIG. 1 as the structure of the audio-signal processing apparatus 10. As a specific structure constituting the functional blocks, a computer-like apparatus shown in FIG. 3 is used in the present embodiment. In FIG. 3, the audio-signal processing apparatus 10 has a structure in which a CPU 21, a ROM (read-only memory) 22, a RAM (random access memory) 15 constituting the prediction-coefficient memory 15, and each circuit section are connected to each other by a bus. The CPU 11 executes various types of programs stored in the ROM 22 to operate as the functional blocks (the envelope calculation section 11, the class-classification-section extracting section 12, the prediction-calculation-section extracting section 13, the class classification section 14, and the prediction calculation section 16) described above by referring to FIG. 1.

The audio-signal processing apparatus 10 is provided with a communication interface 24 for communicating with a network, and a removable drive 28 for reading information from an external storage medium such as a floppy disk or a magneto-optical disk. The audio-signal processing apparatus 10 can read programs for performing the class-classification adaptive processing described above by referring to FIG. 1 through a network or from an external storage medium into a hard disk of a hard-disk apparatus 25 to perform the class-classification processing according to the read programs.

The user inputs various commands through input means 26 such as a keyboard and a mouse to make the CPU 21 execute the class-classification processing described above by referring to FIG. 1. In this case, the audio-signal processing apparatus 10 receives audio data (input audio data) D10 for which sound quality is to be improved, through a data input and output section 27, applies the class-classification processing to the input audio data D10, and outputs audio data D16 of which sound quality has been improved, to the outside through the data input and output section 27.

Figure 4:
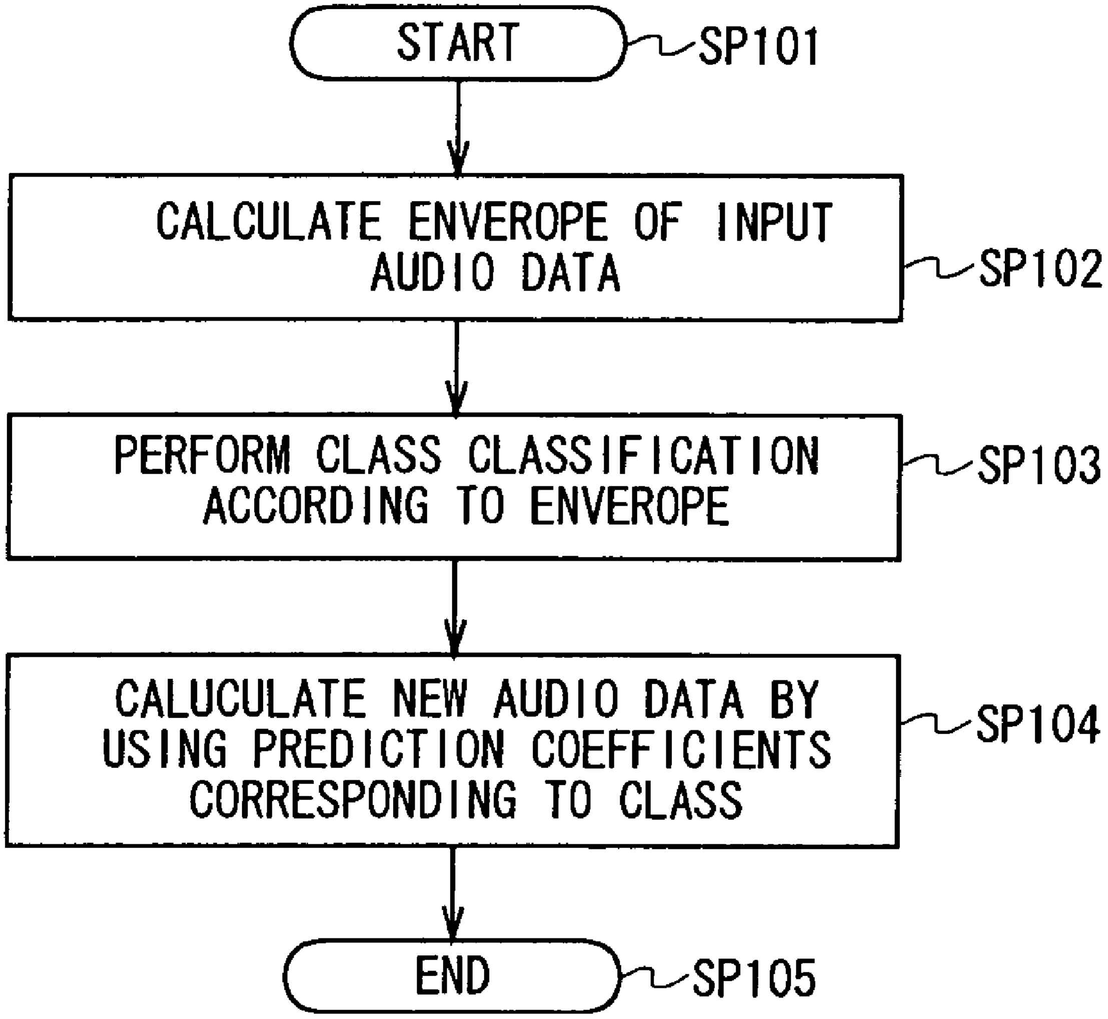
FIG. 4 is a flowchart showing an audio-signal conversion processing procedure according to the first embodiment.

FIG. 4 shows the procedure of the class-classification adaptive processing performed by the audio-signal processing apparatus 10. When the audio-signal processing apparatus 10 starts the processing procedure at step SP101, the envelope calculation section 11 calculates the envelope of the input audio data D10 in the following step SP102.

The calculated envelope indicates the feature of the input audio data D10. In the audio-signal processing apparatus 10, the processing proceeds to step SP103, and the class classification section 14 classifies the data into a class according to the envelope. The audio-signal processing apparatus 10 reads prediction coefficients from the prediction-coefficient memory 15 by using the class code obtained as the result of class classification. Prediction coefficients are stored by learning in advance correspondingly to each class. The audio-signal processing apparatus 10 reads the prediction coefficients corresponding to the class code, so that it uses the prediction coefficients suited to the feature of the envelope.

The prediction coefficients read from the prediction-coefficient memory 15 are used in step SP104 for prediction calculation performed by the prediction calculation section 16. With this operation, the input audio data D10 is converted to desired audio data D16 by prediction calculation adaptive to the feature of the envelope. The input audio data D10 is converted to the audio data D16 having a sound quality improved from that of the input audio data, and the audio-signal processing apparatus 10 terminates the processing procedure in step SP105.

A method for calculating the envelope of the input audio data D10 by the envelope calculation section 11 of the audio-signal processing apparatus 10 will be described next.

Figure 5:
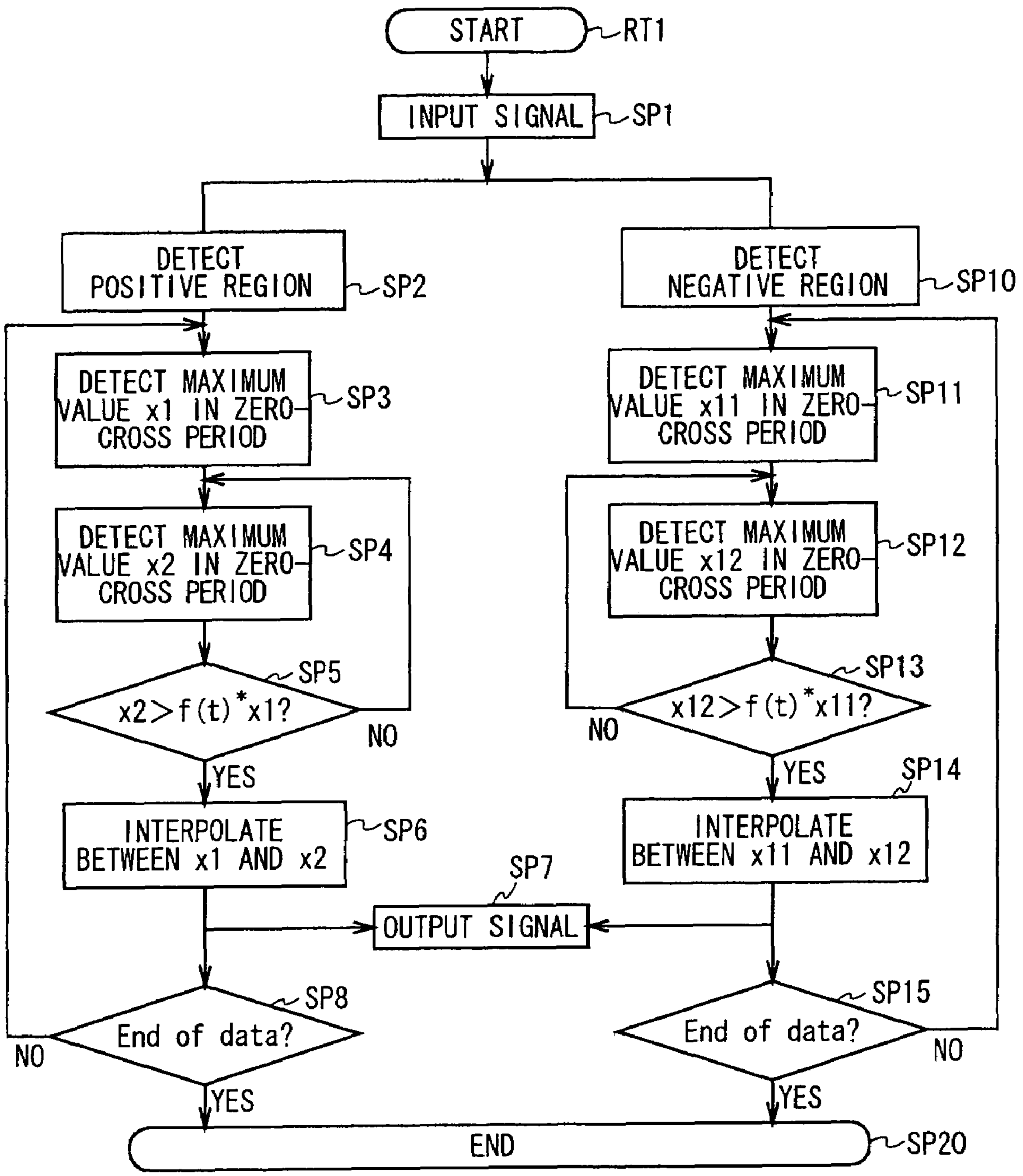
FIG. 5 is a flowchart showing an envelope calculation processing procedure.

As shown in FIG. 5, when the envelope calculation section 11 (shown in FIG. 1) starts an envelope calculation processing procedure RT1, it receives input audio data D10 input from the outside and having positive and negative polarities, through the data input and output section 27 in step SP1, and the procedure proceeds to step SP2 and step SP10.

Figure 6:
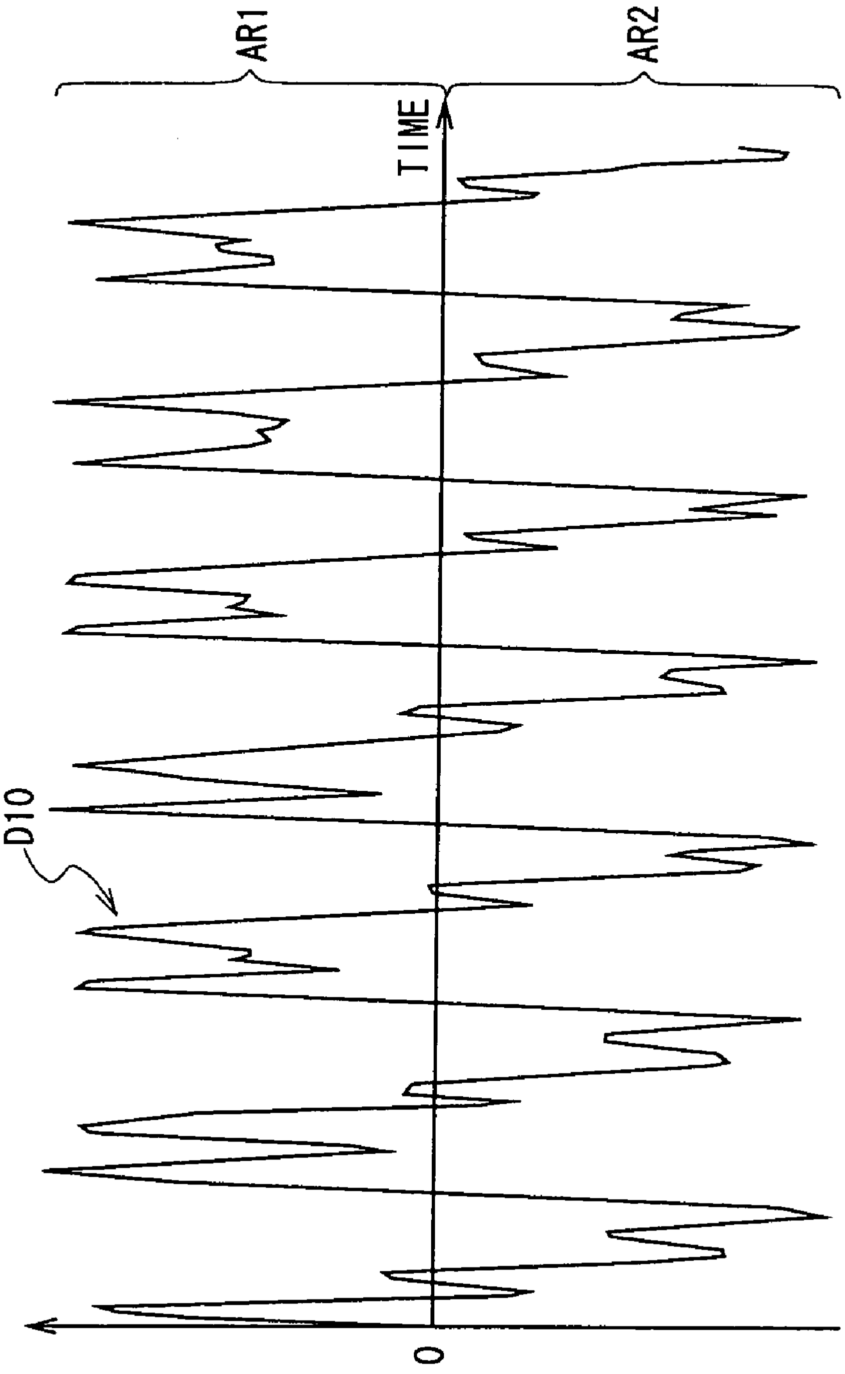
FIG. 6 is a signal waveform view used for describing an envelope calculation method.

In step SP2, the envelope calculation section 11 detects and holds only a signal component in a positive region AR1, in the input audio data D10 input from the outside and having positive and negative polarities, as shown in FIG. 6, and sets a signal component in a negative region AR2 to zero. The processing proceeds to step SP3.

Figure 7:
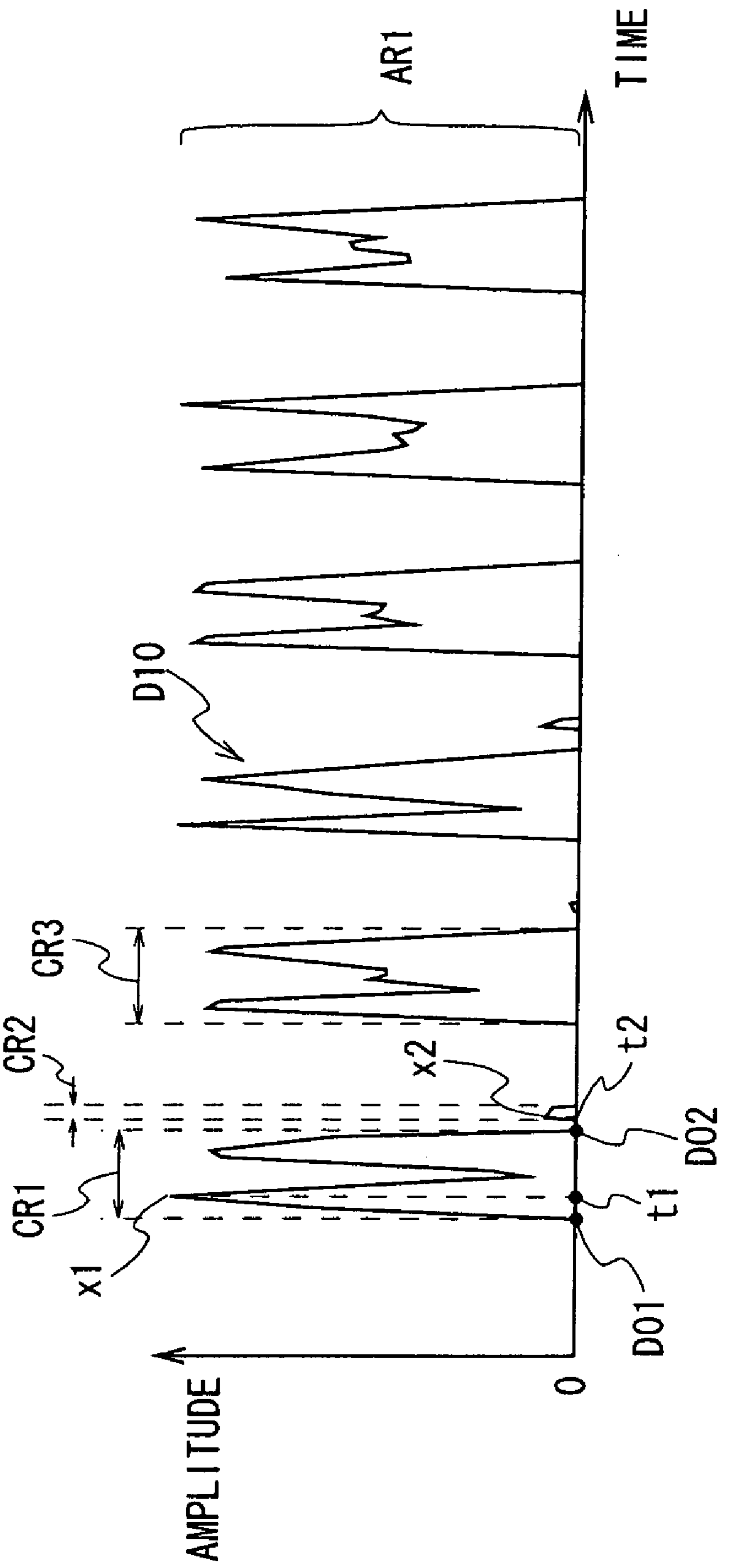
FIG. 7 is a signal waveform view used for describing the envelope calculation method.

In step SP3, the envelope calculation section 11 detects the maximum amplitude x1 in a period CR1 (hereinafter called a zero-cross period) from a sampling time position DO1 when the amplitude of the input audio data D10 in the position region AR1 is zero to a sampling time position DO2 when the amplitude becomes zero the next time, as shown in FIG. 7, and determines whether the maximum value x1 is larger than a threshold specified in advance by an envelope detection program.

The threshold specified in advance by the envelope detection program is a predetermined value used to determine whether the maximum amplitude x1 in the zero-cross period is set to a candidate (sampling point) of an envelope, and is set to a value with which a smooth envelope is detected as a result. When the maximum amplitude x1 in the zero-cross period CR1, which is to be determined, is larger than the threshold, the processing proceeds to step SP4. When the maximum amplitude x1 in the zero-cross period, which is to be determined, is smaller than the threshold, the envelope calculation section 11 continues the process until it detects a zero-cross period CR1 where the maximum value x1 (candidate (sampling point)) larger than the threshold.

In step SP4, the envelope calculation section 11 detects (as shown in FIG. 7) the maximum value x2 in a zero-cross period CR2 which is the zero-cross period next to the zero-cross period CR1 where the maximum value x1 determined to be a candidate (sampling point) has been detected, and the processing proceeds to step SP5.

In step SP5, the envelope calculation section 11 determines whether the value obtained by multiplying the maximum value x1 by the value calculated by a function expressed by $f(t)=p(t_2-t_1)$ by using the maximum values x1 and x2 obtained in steps SP3 and SP4 is larger than the maximum value x2.

In the function f(t), "$t_2$" and "$t_1$" indicates the sampling time positions where the maximum values x1 and x2 have been detected. When the input signal (input audio data D10) has a sampling frequency of 8 kHz and a quantization level of 16 bits, for example, the number of samples between zero-cross positions is five to 20 in many cases. Therefore, five to 20 samples are disposed between "$t_2$" and "$t_1$." In the function, "p" is a parameter which can be set to any value. When it is assumed that the input signal (input audio data D10) has a sampling frequency of 8 kHz and a quantization level of 16 bits, for example, p is set to −90.

The value obtained by multiplying the maximum value x1 by the value expressed by the function $f(t)=P(t_2-t_1)$ indicates the slope between the maximum values x1 and x2. When the maximum value x2 is larger than the value obtained by multiplying the maximum value x1 by the value expressed by the function $f(t)=p(t_2-t_1)$, the amplitude difference between the maximum value x1 and the maximum value x2 is small. As a result, a smooth envelope can be detected. Therefore, when the maximum value x2, which is to be determined, is larger than the value obtained by multiplying the maximum value x1 by the value expressed by the function, an affirmative result is obtained in step SP5, and the procedure proceeds to the following step SP6.

In contrast, when the maximum value x2 is smaller than the value obtained by multiplying the maximum value x1 by the value expressed by the function, another maximum amplitude x2 (FIG. 7) is detected in a zero-cross period (CR3, . . . , CRn) in step SP4 until the maximum value x2 (FIG. 7) larger than the value obtained by multiplying the maximum value x1 by the value expressed by the function is detected. The detection of the maximum value x2 is repeated until it is determined that the maximum value x2 obtained by another detection is smaller than the value obtained by multiplying the maximum value x1 by the value calculated when the function $f(t)=P(t_2-t_1)$ is applied to the maximum value x1 obtained in step SP3 and to the maximum value x2 obtained by the another detection.

In step SP6, the envelope calculation section 11 applies interpolation processing to the data disposed between the maximum value x1 and the maximum value x2 determined to be candidates (sampling points) of the envelope, by using a linear interpolator method. The procedure proceeds to the following steps SP7 and SP8.

In step SP7, the envelope calculation section 11 outputs the data disposed between the maximum value x1 and the maximum value x2, to which interpolation processing has been applied, and the candidates (sampling points) to the class classification section 14 (FIG. 1) as envelope data D11 (FIG. 1).

In step SP8, the envelope calculation section 11 determines whether the input audio data D10, input from the outside, has all been input. When a negative result is obtained, it means that the input audio data D10 is being input. The procedure returns to step SP3, and the envelope calculation section 11 again detects the maximum amplitude x1 in the zero-cross period CR1 in the positive region AR1 of the input audio data D10.

In contrast, when an affirmative result is obtained in step SP8, it means that the input audio data D10 has all been input. The procedure proceeds to step SP20, and the envelope calculation section 11 terminates the envelope calculation processing procedure RT1.

In step SP10, the envelope calculation section 11 detects and holds only the signal component in the negative region AR2 (FIG. 6) in the input audio data D10 input from the outside and having positive and negative polarities, and sets the signal component in the positive region AR1 (FIG. 6) to zero. The processing proceeds to step SP11.

Figure 8:
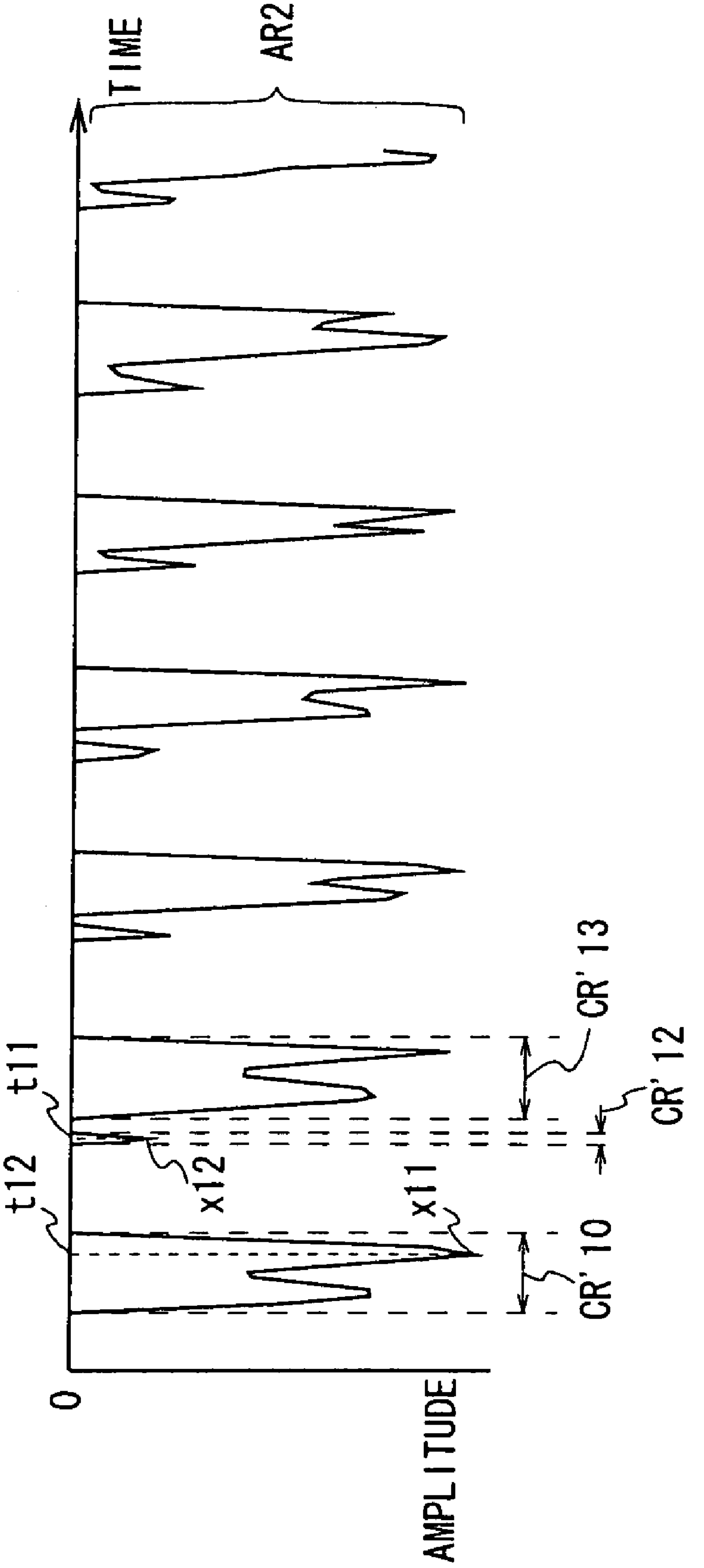
FIG. 8 is a signal waveform view used for describing the envelope calculation method.

In step SP11, the envelope calculation section 11 detects the maximum amplitude x11 in a zero-cross period CR11 in the negative region AR2, as shown in FIG. 8, and determines in the same way as in step SP3 whether the maximum value x11 is larger in the negative direction than a threshold specified in advance by the envelope detection program. When an affirmative result is obtained (namely, the maximum amplitude is larger than the threshold in the negative direction), the processing proceeds to step SP12. When a negative result is obtained (namely, the maximum amplitude is smaller than the threshold in the negative direction), the detection process of step SP11 is repeated until the maximum value y11 larger than the threshold in the negative direction is detected.

In step SP12, the envelope calculation section 11 detects (as shown in FIG. 8) the maximum amplitude x12 in a zero-cross period CR'2 which is the zero-cross period next to the zero-cross period CR'1 which includes the maximum value x11 determined to be a candidate (sampling point), and the processing proceeds to step SP13.

In step SP13, the envelope calculation section 11 determines in the same way as in step SP5 whether the value obtained by multiplying the maximum value x11 by the value calculated by a function expressed by $f(t)=p(t_{12}-t_{11})$ when the function is applied to the maximum values x11 and x12 obtained in steps SP11 and SP12 is larger than the maximum value x12 in the negative direction. In the function, "p" is a parameter which can be set to any value. When it is assumed that the input audio data D10 has a sampling frequency of 8 kHz and a quantization level of 16 bits, for example, p is set to 90.

When an affirmative result is obtained (namely, the value obtained by multiplying the maximum value x11 by the value calculated by the function $f(t)=p(t_{12}-t_{11})$ is larger than the maximum value x12 in the negative direction) in step SP13, the procedure proceeds to step SP14. When a negative result is obtained (namely, the value obtained by multiplying the maximum value x11 by the value calculated by the function $f(t)=p(t_{12}-t_{11})$ is smaller than the maximum value x12 in the negative direction), the detection of the maximum amplitude x12 (FIG. 8) is repeated in a zero-cross period (CR'3, . . . , CR'n) in step SP12 until it is determined that the maximum value x12 (FIG. 8) larger in the negative direction than the value obtained by multiplying the maximum value x11 by the value calculated by the function $f(t)=p(t_{12}-t_{11})$ is detected.

In step SP14, the envelope calculation section 11 applies interpolation processing to the data disposed between the maximum value x11 and the maximum value x12 determined to be candidates (sampling points) of the envelope, by using a linear interpolator method. The procedure proceeds to the following steps SP7 and SP15.

In step SP7, the envelope calculation section 11 outputs the data disposed between the maximum value x11 and the maximum value x12, to which interpolation processing has been applied, and the candidates (sampling points) to the class classification section 14 (FIG. 1) as the envelope data D11 (FIG. 1).

In step SP15, the envelope calculation section 11 determines whether the input audio data D10, input from the outside, has all been input. When a negative result is obtained, it means that the input audio data D10 is being input. The procedure returns to step SP11, and the envelope calculation section 11 again detects the maximum amplitude x11 in a zero-cross period in the negative region AR2 of the input audio data D10.

In contrast, when an affirmative result is obtained in step SP15, it means that the input audio data D10 has all been input. The procedure proceeds to step SP20, and the envelope calculation section 11 terminates the envelope calculation processing procedure RT1.

Figure 9:
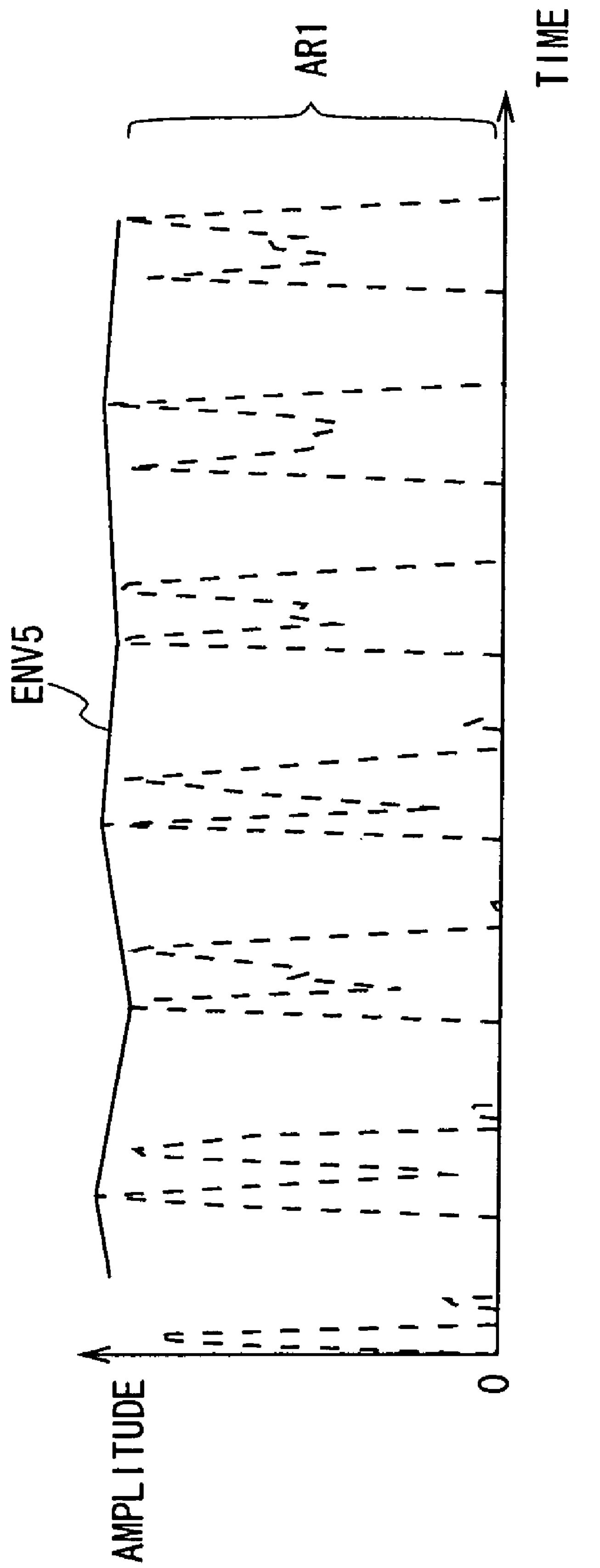
FIG. 9 is a signal waveform view used for describing the envelope calculation method.
Figure 10:
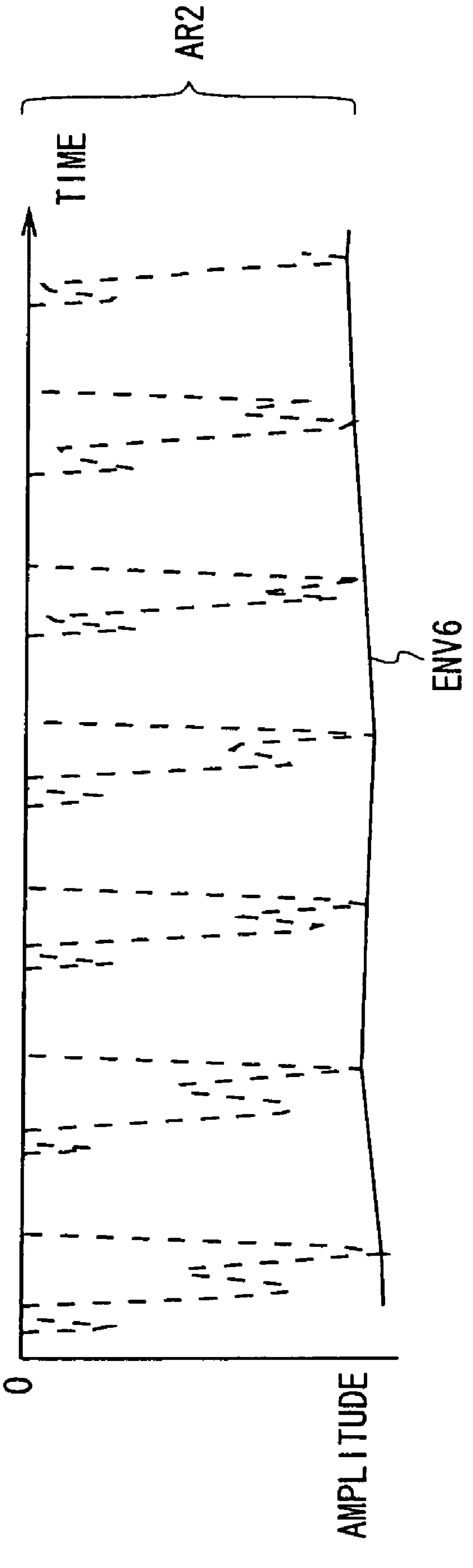
FIG. 10 is a signal waveform view used for describing the envelope calculation method.

As described above, the envelope calculation section 11 can calculate in real time by a simple envelope calculation algorithm, envelope data (candidates (sampling points)) which can generate a smooth envelope ENV5 as that shown in FIG. 9 in the positive region AR1 and a smooth envelope ENV6 as that shown in FIG. 10 in the negative region AR2, and data which is disposed between the candidates and to which interpolation has been applied.

A learning circuit for obtaining in advance by learning a prediction-coefficient set for each class, to be stored in the prediction-coefficient memory 15 described above by referring to FIG. 1 will be described next.

Figure 11:
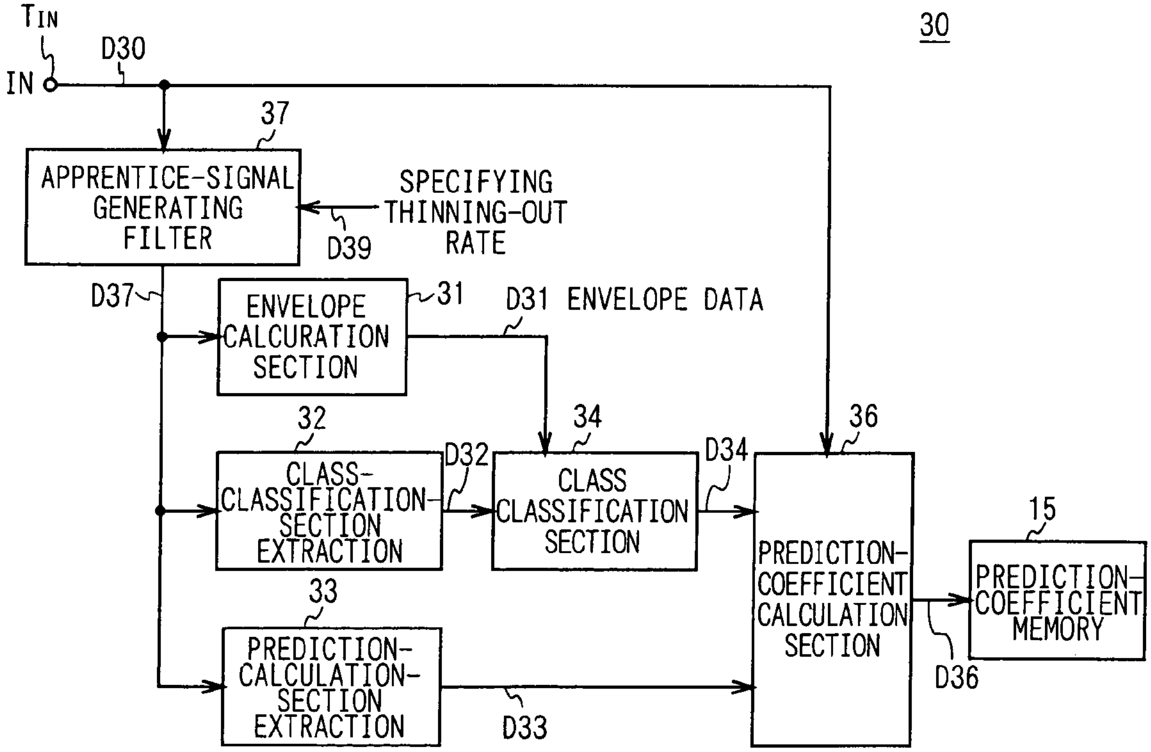
FIG. 11 is a block diagram showing a learning apparatus according to the first embodiment of the present invention.

In FIG. 11, a learning circuit 30 receives high-sound-quality master audio data D30 at an apprentice-signal generating filter 37. The apprentice-signal generating filter 37 thins out the master audio data D30 by a predetermined number of samples at a predetermined interval at a thinning-out rate specified by a thinning-out-rate setting signal D39.

In this case, different prediction coefficients are generated according to the thinning-out rate in the apprentice-signal generating filter 37, and audio data reproduced by the above-described audio-signal processing apparatus 10 differs accordingly. When the sampling frequency is increased to improve the sound quality of audio data in the above-described audio-signal processing apparatus 10, for example, the apprentice-signal generating filter 37 performs thinning-out processing which reduces the sampling frequency. In contrast, when the input audio data D10 is compensated for its missing data samples to improve sound quality in the above-described audio-signal processing apparatus 10, the apprentice-signal generating filter 37 performs thinning-out processing which drops data samples.

As described above, the apprentice-signal generating filter 37 generates apprentice audio data D37 from the master audio data 30 by predetermined thinning-out processing, and sends it to an envelope calculation section 31, to a class-classification-section extracting section 32, and to a prediction-calculation-section extracting section 33.

The envelope calculation section 31 divides the apprentice audio data D37 sent from the apprentice-signal generating filter 37 into portions each corresponding to a predetermined time (for example, corresponding to six samples in the present embodiment), and calculates the envelope of a divided waveform for each time zone by the envelope calculation method described above by referring to FIG. 5.

The envelope calculation section 31 sends the results of envelope calculation for the divided time zones of the apprentice audio data D37 to a class classification section 34 as the envelope waveform data D31 of the apprentice audio data D37.

The class-classification-section extracting section 32 divides the apprentice audio data D37 sent from the apprentice-signal generating filter 37 into portions each corresponding to the same time zone (for example, corresponding to six samples in the present embodiment) as that used by the envelope calculation section 31 to extract audio waveform data D32 to be class-classified, and sends it to the class classification section 34.

The class classification section 34 has an ADRC (adaptive dynamic range coding) circuit section for compressing the envelope waveform data D31 corresponding to the audio waveform data D32 extracted by the class-classification-section extracting section 32 to generate a compression data pattern, and a class-code generating circuit section for generating a class code to which the envelope waveform data D31 belongs.

The ADRC circuit section applies calculation such as that for compressing eight bits to two bits to the envelope waveform data D31 to generate pattern compression data. The ADRC circuit section performs adaptive quantization. Since the circuit can efficiently express a local pattern of a signal level with a short-length word, it is used for generating codes for class classification of signal patterns.

Specifically, when six sets of eight-bit data (envelope waveform data) on the envelope waveform are class-classified, it is necessary to classify into a number of classes as huge as $2^{48}$, and a heavy load is imposed on the circuits. Therefore, the class classification section 14 of the present embodiment performs class classification according to pattern compression data generated by the ADRC circuit section provided therein. When one-bit quantization is applied to six sets of envelope waveform data, for example, the six sets of envelope waveform data can be expressed by six bits, and the data can be classified into 26=64 classes.

When the dynamic range of the envelope within the extracted zones is indicated by DR, the number of assigned bits is indicated by m, the data level of each set of envelope waveform data is indicated by L, and a quantization code is indicated by Q, the ADRC circuit section divides the region between the maximum value MAX and the minimum value MIN in the zone by a specified bit length equally to perform quantization by the same calculation as that expressed by the above-described expression (1). When the six sets of waveform data on the envelope calculated by the envelope calculation section 1 are each formed of eight bits (m=8), for example, each set of data is compressed to two bits in the ADRC circuit section.

When each envelope waveform data compressed in this way is indicated by $q_n$ (n=1 to 6), the class-code generating circuit section provided for the class classification section 34 performs the same calculation as that expressed by the above-described expression (2) according to the compressed envelope waveform data $q_n$ to calculate the class code "class" indicating a class to which the block ($q_1$ to $q_6$) belongs, and sends class-code data D34 indicating the calculated class code "class" to a prediction-coefficient calculation section 36. In the expression (2), "n" indicates the number of compressed envelope waveform data $q_n$, which is six in the present embodiment, and "P" indicates the number of assigned bits, which is two in the present embodiment.

As described above, the class classification section 34 generates the class-code data D34 of the envelope waveform data D31 corresponding to the audio waveform data D32 taken out by the class-classification-section extracting section 32, and sends it to the prediction-coefficient calculation section 36. A prediction-calculation-section extracting section 33 takes out audio waveform data D33 ($x_1, x_2, \ldots, x_n$) corresponding to the class-code data D34, in the time domain and sends it to the prediction-coefficient calculation section 36.

The prediction-coefficient calculation section 36 uses the class code "class" sent from the class classification section 34, the audio waveform data D33 taken out for each class code "class," and the high-quality master audio data D30 input from the input terminal $T_{IN}$ to form a normal equation.

Specifically, the levels of n samples of the apprentice audio data D37 are set to $x_1, x_2, \ldots, x_n$, and quantized data obtained by applying p-bit ADRC to the levels is set to $q_1, \ldots, q_n$. The class code "class" in this zone is defined as in the above-described expression (2). When the levels of the apprentice audio data D37 is set to $x_1, x_2, \ldots, x_n$, and the level of the high-quality master audio data D30 is set to "y," an n-tap linear estimate equation is obtained as follows for each class code by using prediction coefficients $w_1, w_2, \ldots, w_n$.

$$y=w_1x_1+w_2x_2+\ldots+w_nx_n \tag{4}$$

Before learning, $w_n$ is an undetermined coefficient.

The learning circuit 30 learns a plurality of audio data for each class code. When the number of data samples is M, the following expression is specified according to the above-described expression (4), $$y_k=w_1x_{k1}+w_2x_{k2}+\ldots+w_nx_{kn} \tag{5}$$

where k is 1, 2, . . . , M.

When M>n, the prediction coefficients $w_1, \ldots, W_n$ are not uniquely determined, elements of an error vector "e" are defined by the following expression, $$e_k=y_k-\{w_1x_{k1}+w_2x_{k2}+\ldots+w_nx_{kn}\} \tag{6}$$

(where k is 1, 2, . . . , M), and $$e_2=\sum_{k=0}^{M} e_k^2 \tag{7}$$

prediction coefficients which make the foregoing expression minimum are obtained. This is a solution with the use of the so-called least squares method.

The partial differential coefficient of $w_n$ is obtained in the expression (7). In this case, $$\frac{\partial e^2}{\partial wi}=\sum_{k=0}^{M}2\left(\frac{\partial e_k}{\partial wi}\right)e_k=\sum_{k=0}^{M}2x_{ki}\cdot e_k=\sum_{k=0}^{M}2x_{ki}\cdot e_k \quad (i=1, 2, \ldots, n) \tag{8}$$

wn (n=1 to 6) needs to be obtained such that the foregoing expression is zero.

With the use of the following expressions, $$x_{ij}=\sum_{P=0}^{M} x_{Pi}\cdot x_{pj} \tag{9}$$

$$Y_i=\sum_{k=0}^{M} x_{ki}\cdot y_k \tag{10}$$

when $X_{ij}$ and $Y_i$ are defined, the expression (8) is expressed with a matrix $$\begin{bmatrix} x_{11} & x_{12} & \cdots & x_{1n} \\ x_{21} & x_{22} & \cdots & x_{2n} \\ \vdots & \vdots & & \\ x_{m1} & x_{m2} & \cdots & x_{mn} \end{bmatrix} \begin{bmatrix} W_1 \\ W_2 \\ \vdots \\ W_n \end{bmatrix} = \begin{bmatrix} Y_1 \\ Y_2 \\ \vdots \\ Y_n \end{bmatrix} \quad (11)$$

by the foregoing expression.

This equation is generally called a normal equation. In this equation, n equals six.

After all learning data (master audio data D30, class code "class," and audio waveform data D33) has been input, the prediction-coefficient calculation section 36 forms the normal equation indicated by the above-described expression (11) for each class code "class," uses a general matrix solution such as a sweeping method to solve the normal equation for $W_n$, and calculates prediction coefficients for each class code. The prediction-coefficient calculation section 36 writes the calculated prediction coefficients (D36) into the prediction-coefficient memory 15.

As the result of such learning, the prediction-coefficient memory 15 stores prediction coefficients used for estimating high-quality audio data "y" for each of the patterns specified by the quantized data $q_1, \ldots, q_6$, for each class code. The prediction-coefficient memory 15 is used in the audio-signal processing apparatus 10 described above by referring to FIG. 1. With such processing, learning of prediction coefficients used for generating high-quality audio data from normal audio data according to a linear estimate equation is finished.

As described above, since the apprentice-signal generating filter 37 performs thinning-out processing for high-quality master audio data with a degree at which interpolation processing is performed in the audio-signal processing apparatus 10 being taken into account, the learning circuit 30 can generate prediction coefficients used for interpolation processing performed by the audio-signal processing apparatus 10.

In the above structure, the audio-signal processing apparatus 10 uses the envelope calculation section 11 to calculate the envelope of the input audio data D10 in the time waveform zone. This envelope changes depending on the sound quality of the input audio data D10. The audio-signal processing apparatus 10 specifies the class of the input audio data D10 according to the envelope thereof.

The audio-signal processing apparatus 10 obtains by learning in advance prediction coefficients used for obtaining, for example, high-quality audio data (master audio data) having no distortion, for each class, and applies prediction calculation to the input audio data D10 class-classified according to the envelope, by using the prediction coefficients corresponding to the class. With this operation, since prediction calculation is applied to the input audio data D10 by using the prediction coefficients corresponding to its sound quality, the sound quality of the data is improved to a practically sufficient level.

During learning for generating prediction coefficients for each class, when prediction coefficients are obtained for each of a number of master audio data having different phases, even if a phase shift occurs during class-classification adaptive processing applied to the input audio data D10 in the audio-signal processing apparatus 10, a process handling the phase shift can be achieved.

With the above structure, since the input audio data D10 is class-classified according to the envelope of the input audio data D10 in the time waveform zones, and prediction calculation is applied to the input audio data D10 by using the prediction coefficients based on the result of class classification, the input audio data D10 can be converted to the audio data D16 having a further higher sound quality.

Figure 12:
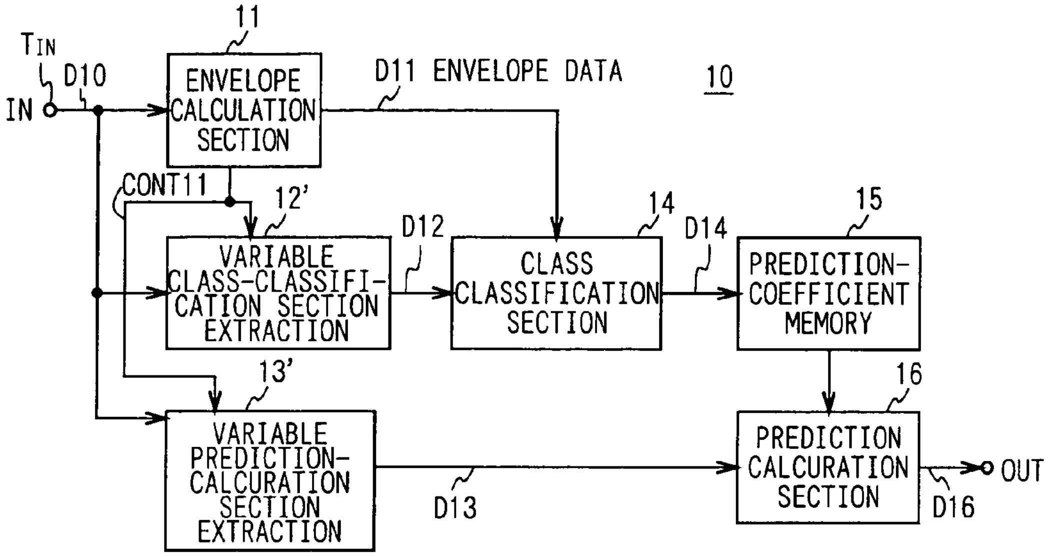
FIG. 12 is a block diagram showing a digital-signal processing apparatus according to another embodiment.
Figure 13:
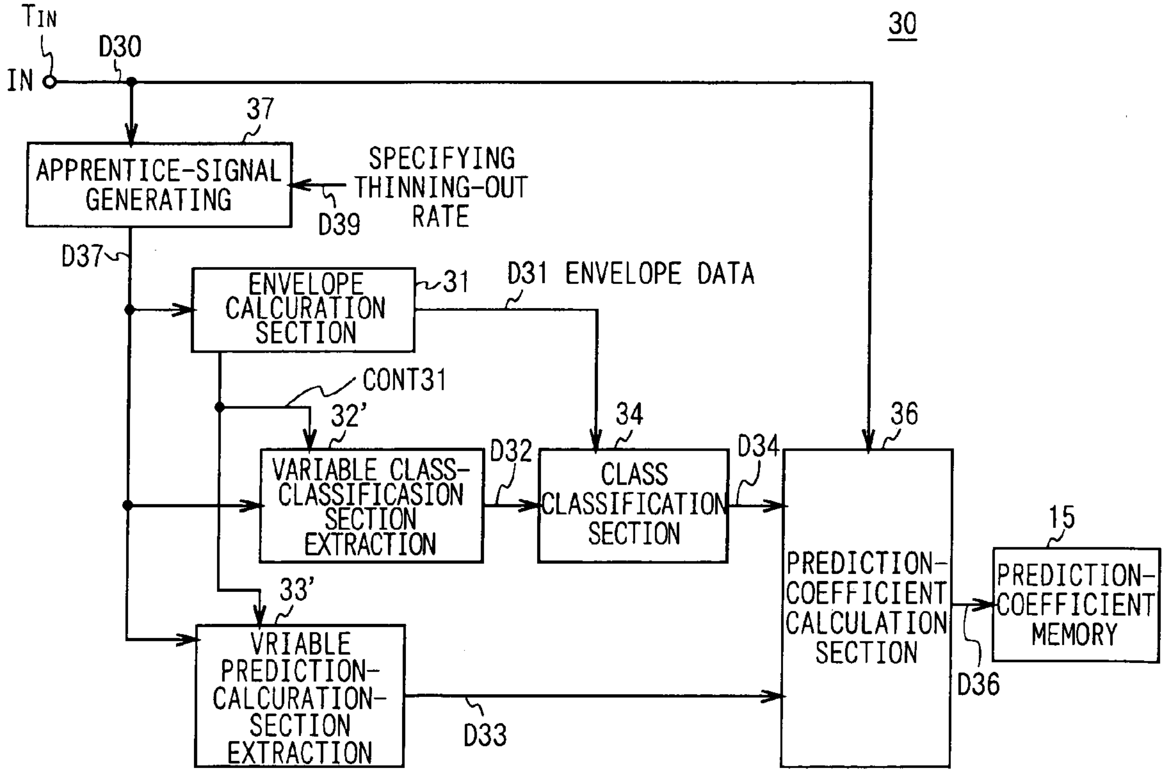
FIG. 13 is a block diagram showing a learning apparatus according to the another embodiment.

In the above-described embodiment, the class-classification-section extracting sections 12 and 32 and the prediction-calculation-section extracting sections 13 and 33 always extract predetermined zones from the input audio data D10 and D37 in the audio-signal processing apparatus 10 and in the learning apparatus 30. The present invention is not limited to this case. As shown in FIG. 12 and FIG. 13 in which the same symbols as those used in FIG. 1 and FIG. 11 are assigned the portions corresponding to those shown in FIG. 1 and FIG. 11, for example, zones to be extracted from the input audio data D10 and D37 may be controlled by sending extraction-control signals CONT11 and CONT31 according to the features of the envelopes calculated by the envelope calculation sections 11 and 13, to a variable class-classification-section extracting section 12', a variable prediction-calculation-section extracting section 13', a variable class-classification-section extracting section 32', and a variable prediction-calculation-section extracting section 33'.

In the above-described embodiment, class classification is performed according to the envelope data D11. The present invention is not limited to this case. Class classification may be performed according to both the waveform and the envelope of the input audio data D10 when the class-classification-section extracting section 12 performs class classification according to the waveform of the input audio data D10, the envelope calculation section 11 calculates the class of the envelope, and the class classification section 14 integrates these two class information items.

(2) Second Embodiment

Figure 14:
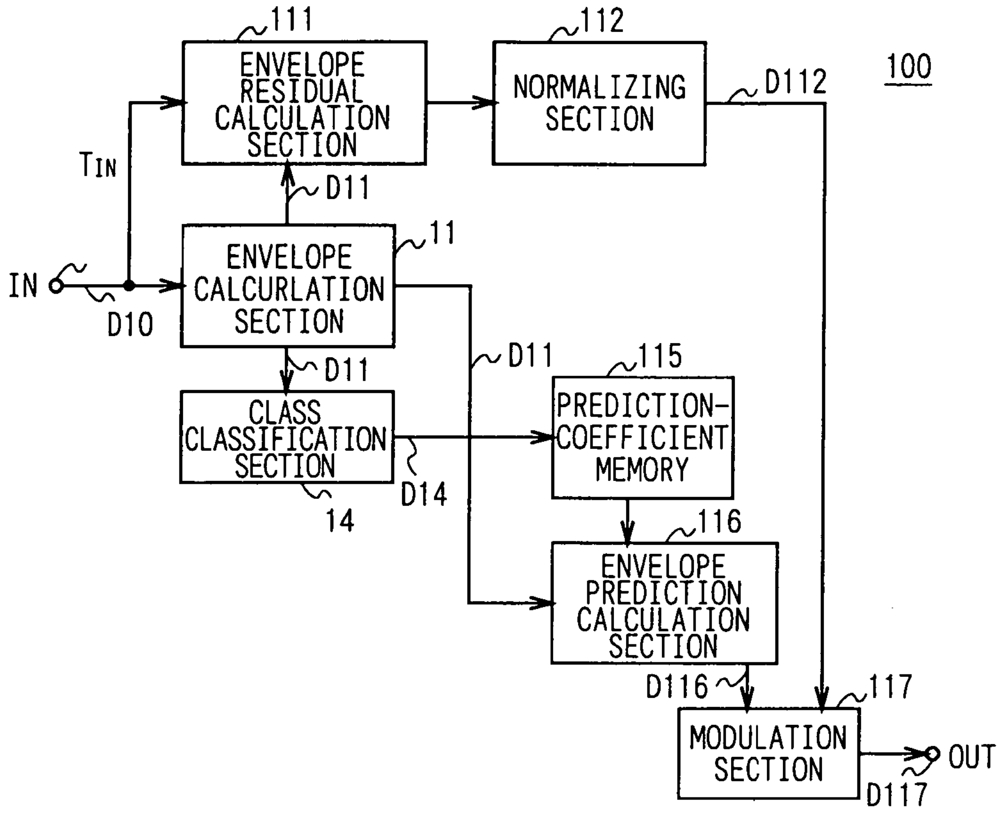
FIG. 14 is a block diagram showing a digital-signal processing apparatus according to a second embodiment of the present invention.
Figure 17:
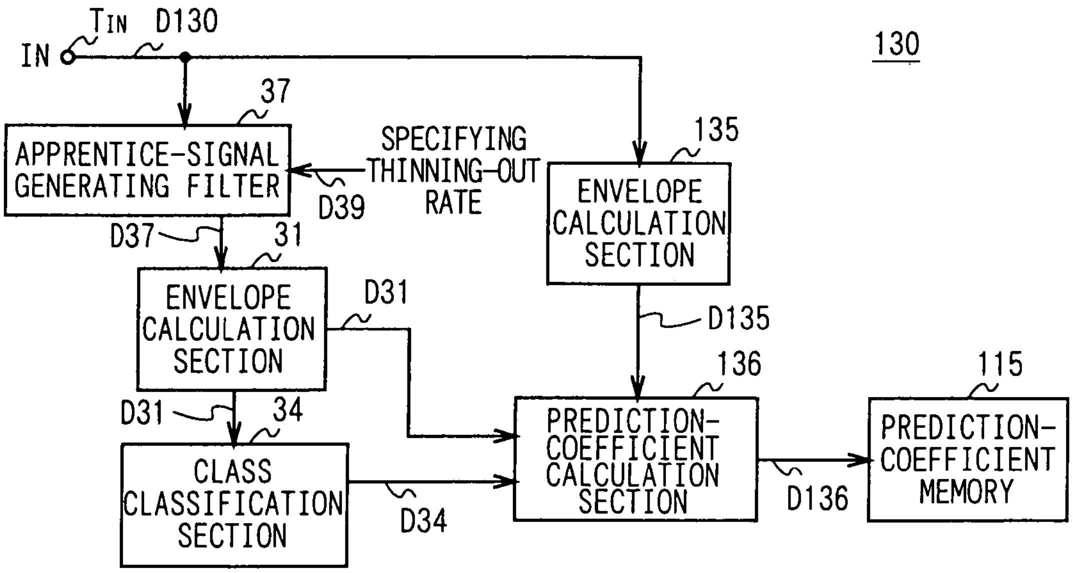
FIG. 17 is a block diagram showing a learning apparatus according to the second embodiment of the present invention.
Figure 15:
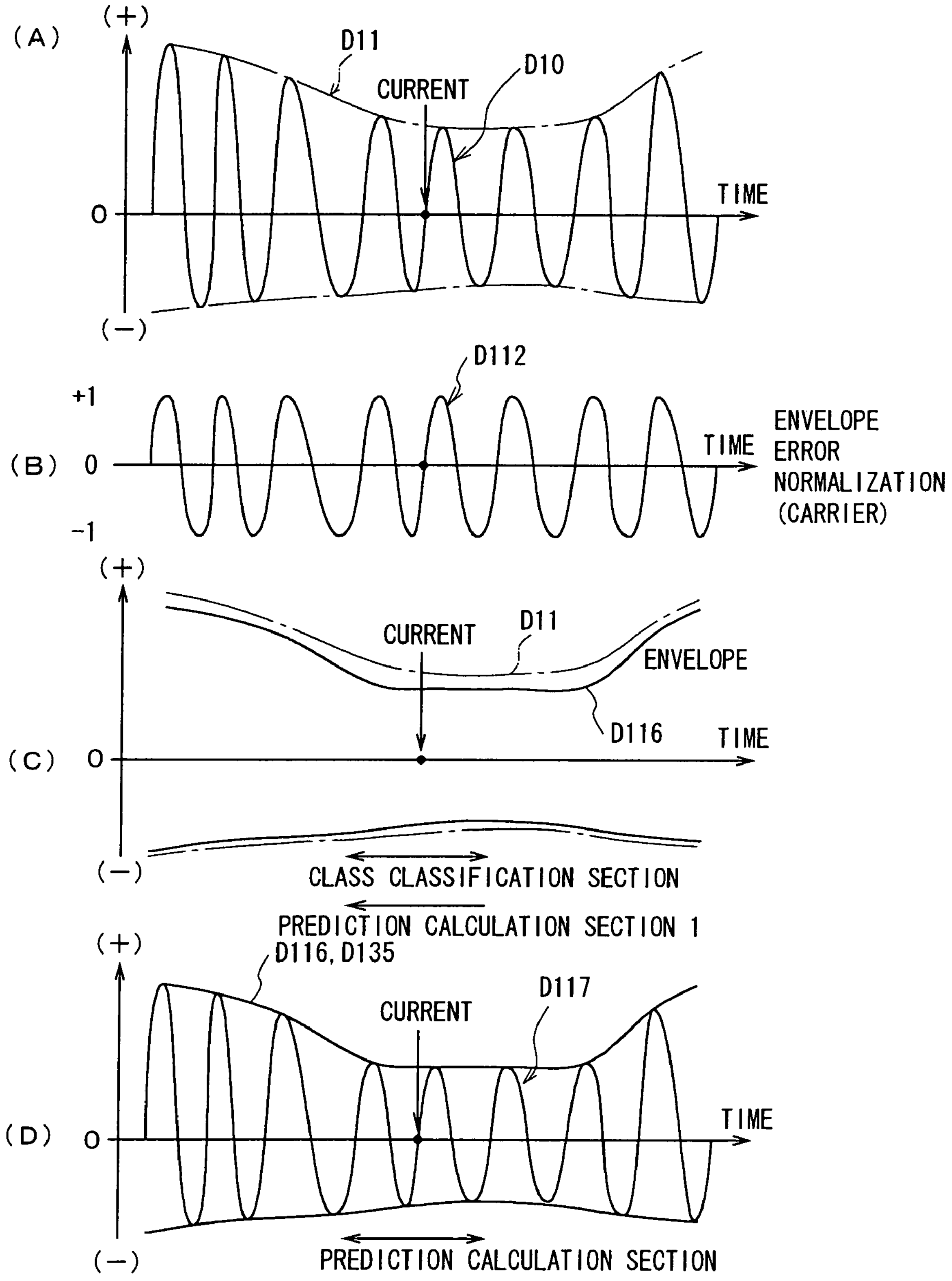
FIG. 15 is a signal waveform view used for describing class-classification adaptive processing according to the second embodiment.

In FIG. 14 in which the same symbols as those used in FIG. 1 are assigned to the portions corresponding to those shown in FIG. 1, an envelope calculation section 11 divides input audio data D10 shown in FIG. 15(A), input from an input terminal $T_{IN}$ into portions each corresponding to a predetermined time (for example, corresponding to six samples in the present embodiment), and calculates the envelope of a divided waveform for each time zone by the envelope calculation method described above by referring to FIG. 5.

The envelope calculation section 11 sends the results of envelope calculation for the divided time zones of the input audio data D10 to a class classification section 14, to an envelope residual calculation section 111, and to an envelope prediction calculation section 116 as the envelope waveform data D11 (shown in FIG. 15(C)) of the input audio data D10.

The envelope residual calculation section 111 obtains the residual between the input audio data D10 and the envelope data D11 sent from the envelope calculation section 11, and a normalization section 112 normalizes it to extract the carrier D112 (shown in FIG. 15(B)) of the input audio data D10 and sends it to a modulation section 117.

The class classification section 14 has an ADRC (adaptive dynamic range coding) circuit section for compressing the envelope waveform data D11 to generate a compression data pattern, and a class-code generating circuit section for generating a class code to which the envelope waveform data D11 belongs.

The ADRC circuit section applies calculation such as that for compressing eight bits to two bits to the envelope waveform data D11 to generate pattern compression data. The ADRC circuit section performs adaptive quantization. Since the circuit can efficiently express a local pattern of a signal level with a short-length word, it is used for generating codes for class classification of signal patterns.

Specifically, when six sets of eight-bit data (envelope waveform data) on the envelope waveform are class-classified, it is necessary to classify into a number of classes as huge as $2^{48}$, and a heavy load is imposed on the circuits. Therefore, the class classification section 14 of the present embodiment performs class classification according to the pattern compression data generated by the ADRC circuit section provided therein. When one-bit quantization is applied to the six sets of envelope waveform data, for example, the six sets of envelope waveform data can be expressed by six bits, and the data can be classified into $2^6=64$ classes.

When the dynamic range of the envelope within the extracted zones is indicated by DR, the number of assigned bits is indicated by m, the data level of each set of envelope waveform data is indicated by L, and a quantization code is indicated by Q, the ADRC circuit section divides a region between the maximum value MAX and the minimum value MIN in the zone by a specified bit length equally to perform quantization according to the above-described expression (1). In the expression (1), { } indicates that the result is rounded off at the decimal point. When the six sets of waveform data on the envelope calculated by the envelope calculation section 1 are each formed of eight bits (m=8), for example, each set of data is compressed to two bits in the ADRC circuit section.

When each envelope waveform data compressed in this way is indicated by $q_n$ (n=1 to 6), the class-code generating circuit section provided for the class classification section 14 performs the calculation shown by the above-described expression (2) according to the compressed envelope waveform data $q_n$ to calculate the class code “class” indicating a class to which the block ($q_1$ to $q_6$) belongs, and sends class-code data D14 indicating the calculated class code “class” to a prediction-coefficient memory 15. This class code “class” indicates a reading address where prediction coefficients are read from the prediction-coefficient memory 15.

As described above, the class classification section 14 generates the class-code data D14 of the envelope waveform data D11, and sends it to the prediction-coefficient memory 15.

The prediction-coefficient memory 15 stores the prediction-coefficient set corresponding to each class code at the address corresponding to the class code. According to the class-code data D14 sent from the class classification section 14, the prediction-coefficient set $W_1$ to $W_n$ stored at the address corresponding to the class code is read, and sent to the envelope prediction calculation section 116.

The envelope prediction calculation section 116 applies the sum-of-products calculation indicated by the expression (3) to the prediction-coefficient set $W_1$ to $W_n$ and to the envelope waveform data D11 ($x_1$ to $x_n$) calculated by the envelope calculation section 11 to obtain a prediction result y'. This prediction value y' is sent to the modulation section 117 as the envelope data D116 (FIG. 14(C)) of audio data of which the sound quality has been improved.

The modulation section 117 modulates the carrier D112 sent from the envelope residual calculation section 111 with the envelope data D116 to generate audio data D117 of which the sound quality has been improved, as shown in FIG. 15(D), and outputs it.

Figure 16:
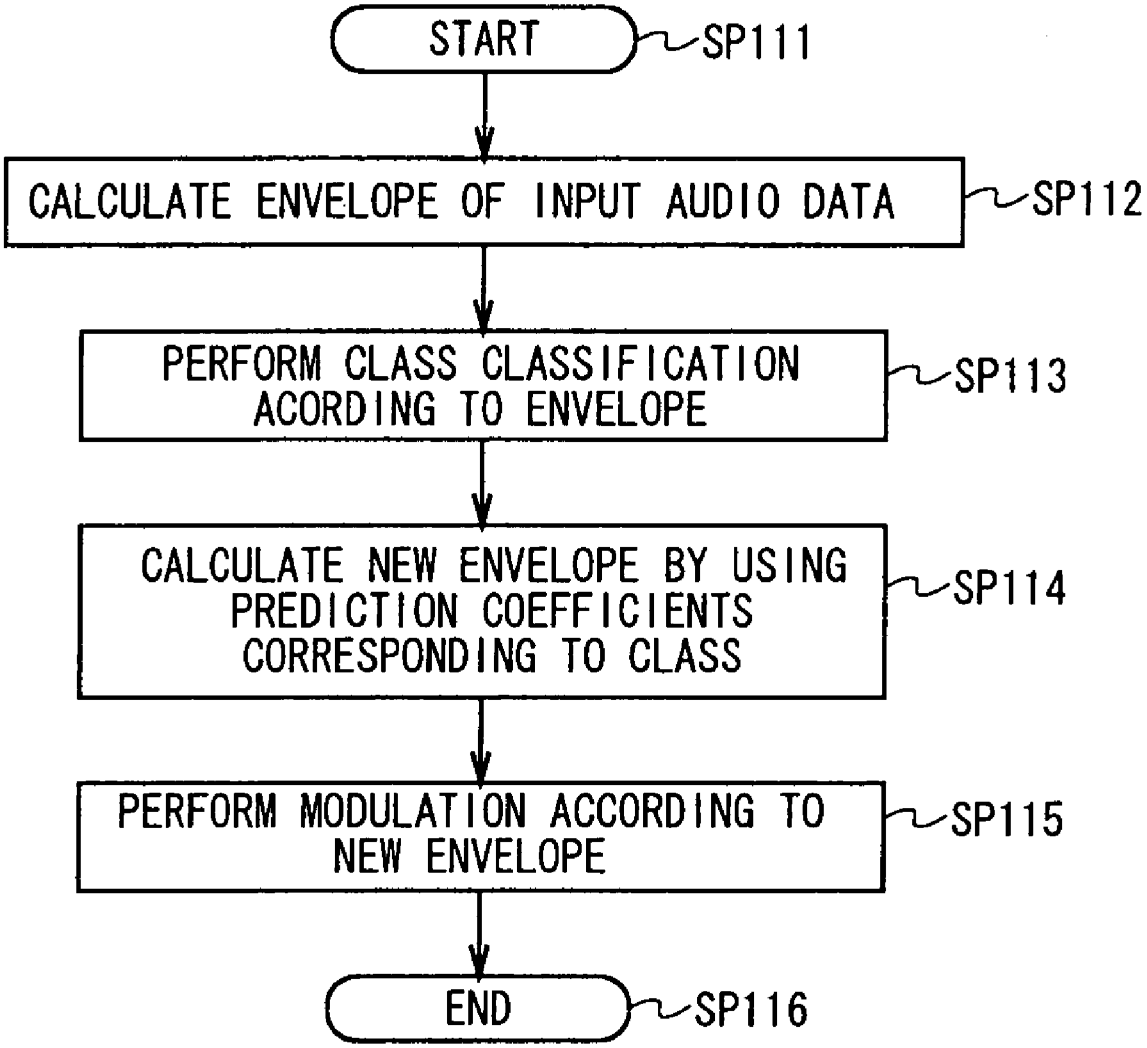
FIG. 16 is a flowchart showing an audio-signal conversion processing procedure according to the second embodiment.

FIG. 16 shows the procedure of class-classification adaptive processing performed by the audio-signal processing apparatus 100. When the audio-signal processing apparatus 100 starts the processing procedure at step SP111, the envelope calculation section 11 calculates the envelope of the input audio data D10 in the following step SP112.

The calculated envelope indicates the feature of the input audio data D10. In the audio-signal processing apparatus 10, the processing proceeds to step SP113, and the class classification section 14 classifies the data into a class according to the envelope. The audio-signal processing apparatus 100 reads the prediction coefficients from the prediction-coefficient memory 15 by using the class code obtained as the result of class classification. Prediction coefficients are stored by learning in advance correspondingly to each class. The audio-signal processing apparatus 100 reads the prediction coefficients corresponding to the class code, so that it uses the prediction coefficients suited to the feature of the envelope.

The prediction coefficients read from the prediction-coefficient memory 115 are used in step SP114 for prediction calculation performed by the envelope prediction calculation section 116. With this operation, a new envelope used for obtaining desired audio data D117 is calculated by prediction calculation adaptive to the feature of the envelope of the input audio data D10. When the new envelope is calculated in step SP114, the audio-signal processing apparatus 100 modulates the carrier of the input audio data D10 with the new envelope in step SP115 to obtain the desired audio data D117.

The input audio data D10 is converted to the audio data D117 having better sound quality, and the audio-signal processing apparatus 100 terminates the processing procedure in step SP116.

A learning circuit for obtaining in advance by learning a prediction-coefficient set for each class, to be stored in the prediction-coefficient memory 15 described above by referring to FIG. 14 will be described next.

In FIG. 16 in which the same symbols as those used in FIG. 10 are assigned to the portions corresponding to those shown in FIG. 10, a learning circuit 130 receives high-sound-quality master audio data D130 at an apprentice-signal generating filter 37. The apprentice-signal generating filter 37 thins out the master audio data D130 by a predetermined number of samples at a predetermined interval at a thinning-out rate specified by a thinning-out-rate setting signal D39.

In this case, different prediction coefficients are generated according to the thinning-out rate in the apprentice-signal generating filter 37, and audio data reproduced by the above-described audio-signal processing apparatus 100 differs accordingly. When the sampling frequency is increased to improve the sound quality of audio data in the above-described audio-signal processing apparatus 100, for example, the apprentice-signal generating filter 37 performs thinning-out processing which reduces the sampling frequency. In contrast, when the input audio data D10 is compensated for its missing data samples to improve sound quality in the above-described audio-signal processing apparatus 100, the apprentice-signal generating filter 37 performs thinning-out processing which drops data samples.

As described above, the apprentice-signal generating filter 37 generates apprentice audio data D37 from the master audio data D130 by the predetermined thinning-out processing, and sends it to an envelope calculation section 31.

The envelope calculation section 31 divides the apprentice audio data D37 sent from the apprentice-signal generating filter 37 into portions each corresponding to a predetermined time (for example, corresponding to six samples in the present embodiment), and calculates the envelope of a divided waveform for each time zone by the envelope calculation method described above by referring to FIG. 4.

The envelope calculation section 31 sends the results of envelope calculation for the divided time zones of the apprentice audio data D37 to a class classification section 34 as the envelope waveform data D31 of the apprentice audio data D37.

The class classification section 34 has an ADRC (adaptive dynamic range coding) circuit section for compressing the envelope waveform data D31 to generate a compression data pattern, and a class-code generating circuit section for generating a class code to which the envelope waveform data D31 belongs.

The ADRC circuit section applies calculation such as that for compressing eight bits to two bits to the envelope waveform data D31 to generate pattern compression data. The ADRC circuit section performs adaptive quantization. Since the circuit can efficiently express a local pattern of a signal level with a short-length word, it is used for generating codes for class classification of signal patterns.

Specifically, when six sets of eight-bit data (envelope waveform data) on the envelope waveform is class-classified, it is necessary to classify into a number of classes as huge as $2^{48}$, and a heavy load is imposed on the circuits. Therefore, the class classification section 14 of the present embodiment performs class classification according to pattern compression data generated by the ADRC circuit section provided therein. When one-bit quantization is applied to the six sets of envelope waveform data, for example, the six sets of envelope waveform data can be expressed by six bits, and the data can be classified into $2^6=64$ classes.

When the dynamic range of the envelope within the extracted zones is indicated by DR, the number of assigned bits is indicated by m, the data level of each set of envelope waveform data is indicated by L, and a quantization code is indicated by Q, the ADRC circuit section divides the region between the maximum value MAX and the minimum value MIN in the zone by a specified bit length equally to perform quantization by the same calculation as that expressed by the above-described expression (1). When the six sets of waveform data on the envelope calculated by the envelope calculation section 1 are each formed of eight bits (m=8), for example, each set of data is compressed to two bits in the ADRC circuit section.

When each envelope waveform data compressed in this way is indicated by $q_n$ (n=1 to 6), the class-code generating circuit section provided for the class classification section 34 performs the same calculation as that expressed by the above-described expression (2) according to the compressed envelope waveform data $q_n$ to calculate the class code "class" indicating a class to which the block ($q_1$ to $q_6$) belongs, and sends class-code data D34 indicating the calculated class code "class" to a prediction-coefficient calculation section 136.

As described above, the class classification section 34 generates the class-code data D34 of the envelope waveform data D31, and sends it to the prediction-coefficient calculation section 136. The prediction-coefficient calculation section 136 receives the envelope waveform data D31 ($x_1, x_2, \ldots, x_n$) calculated according to the apprentice audio data D37.

The prediction-coefficient calculation section 136 uses the class code "class" sent from the class classification section 34, the envelope waveform data D31 calculated for each class code "class" according to the apprentice audio data D37, and the envelope data carrier D135 (FIG. 15(B)) extracted by the envelope calculation section 135 from the master audio data D130 input from the input terminal $T_{IN}$ to form a normal equation.

Specifically, the levels of n samples of the envelope waveform data D31 calculated according to the apprentice audio data D37 are set to $x_1, x_2, \ldots, x_n$, and quantized data obtained by applying p-bit ADRC to the levels is set to $q_1, \ldots, q_n$. The class code "class" in this zone is defined as in the above-described expression (2). When the levels of the envelope waveform data D31 calculated according to the apprentice audio data D37 are set to $x_1, x_2, \ldots, x_n$, and the level of the envelope waveform of the high-quality master audio data D130 is set to "y," an n-tap linear estimate equation is specified for each class code by using prediction coefficients $w_1, w_2, \ldots, w_n$. The equation is the expression (4) described above. Before learning, $w_n$ is an undetermined coefficient.

The learning circuit 130 learns a plurality of audio data (envelope) for each class code. When the number of data samples is M, the above-described expression (5) is specified according to the above-described expression (4), where k is 1, 2, . . . , M.

When M>n, since the prediction coefficients $w_1, \ldots, w_n$ are not uniquely determined, elements of an error vector "e" are defined by the expression (6) (where k is 1, 2, . . . , M), and prediction coefficients which makes the expression (7) minimum are obtained. This is a solution with the use of the so-called least squares method.

The partial differential coefficient of $w_n$ is obtained in the expression (7). In this case, $w_n$ (n=1 to 6) needs to be obtained such that the expression (8) is zero.

When $X_{ij}$ and $Y_i$ are defined as in the expressions (9) and (10), the expression (8) is expressed with a matrix by the expression (11).

This equation is generally called a normal equation. In this equation, n equals six.

After all learning data (master audio data D30, class code "class," and audio waveform data D33) has been input, the prediction-coefficient calculation section 36 forms the normal equation indicated by the above-described expression (11) for each class code "class," uses a general matrix solution such as a sweeping method to solve the normal equation for $w_n$, and calculates prediction coefficients for each class code. The prediction-coefficient calculation section 36 writes the calculated prediction coefficients (D36) into the prediction-coefficient memory 15.

As the result of such learning, the prediction-coefficient memory 15 stores prediction coefficients used for estimating high-quality audio data "y" for each of the patterns specified by the quantized data $q_1, \ldots, q_6$, for each class code. The prediction-coefficient memory 15 is used in the audio-signal processing apparatus 100 described above by referring to FIG. 14. With this processing, learning of prediction coefficients used for generating high-quality audio data from normal audio data according to a linear estimate equation is finished. The method for generating high-quality audio data from normal audio data is not limited to the linear-estimate-equation method. Various methods can be used.

As described above, since the apprentice-signal generating filter 37 performs thinning-out processing for high-quality master audio data with a degree at which interpolation processing is performed in the audio-signal processing apparatus 100 being taken into account, the learning circuit 130 can generate prediction coefficients used for interpolation processing performed by the audio-signal processing apparatus 10.

In the above structure, the audio-signal processing apparatus 100 uses the envelope calculation section 11 to calculate the envelope of the input audio data D10 in the time waveform zone. This envelope changes depending on the sound quality of the input audio data D10. The audio-signal processing apparatus 100 specifies the class of the input audio data D10 according to the envelope thereof.

The audio-signal processing apparatus 10 obtains by learning in advance prediction coefficients used for obtaining, for example, high-quality audio data (master audio data) having no distortion, for each class, and applies prediction calculation to the envelope of the input audio data D10 class-classified according to the envelope, by using the prediction coefficients corresponding to the class. With this operation, since prediction calculation is applied to the envelope of the input audio data D10 by using the prediction coefficients corresponding to its sound quality, the envelope of an audio-data waveform in which sound quality has been improved to a practically sufficient level is obtained. The carrier is modulated according to the envelope to obtain audio data having improved sound quality.

During learning for generating prediction coefficients for each class, when prediction coefficients are obtained for each of a number of master audio data having different phases, even if a phase shift occurs during class-classification adaptive processing applied to the input audio data D10 in the audio-signal processing apparatus 100, a process handling the phase shift can be achieved.

With the above structure, since the input audio data D10 is class-classified according to the envelope of the input audio data D10 in the time waveform zone, and prediction calculation is applied to the envelope of the input audio data D10 by using the prediction coefficients based on the result of class classification, an envelope can be generated which allows the input audio data D10 to be converted to the audio data D117 having a further higher sound quality.

In the above-described embodiment, class classification is performed according to the envelope data D11. The present invention is not limited to this case. Class classification may be performed according to both the waveform and the envelope of the input audio data D10 when the input audio data D10 is input to the class classification section 14, the class classification section 14 performs class classification according to the waveform of the input audio data D10, the envelope calculation section 11 applies class classification to the envelope, and the class classification section 14 integrates these two classes.

(3) Other Embodiments

In the above embodiments, the envelope calculation method described above by referring to FIG. 5 is used. The present invention is not limited to this case. Various other envelope calculation methods, such as a method for just connecting peaks, can be used.

In the above embodiments, a linear prediction method is used. The present invention is not limited to this case. In short, a result obtained by learning needs to be used. Various prediction methods can be used, such as a high-order-function method and, when digital data input from the input terminal $T_{IN}$ is image data, a method for predicting from pixel values themselves.

In the above embodiments, the class classification section 14 generates a compression data pattern by ADRC. The present invention is not limited to this case. Compression means such as reversible coding (DPCM: differential pulse code modulation) or vector quantization (VQ: vector quantize) may be used.

In the above embodiments, the apprentice-signal generating filter 37 of the learning circuit 30 thins out by a predetermined number of samples. The present invention is not limited to this case. Various other methods can be used, such as reducing the number of bits.

In the above embodiments, the present invention is applied to an apparatus for processing audio data. The present invention is not limited to this case. The present invention can be widely applied to other cases, such as those in which image data or other types of data is converted.

As described above, according to the present invention, since an input digital signal is classified into a class according to the envelope of the input digital signal, and the input digital signal is converted by the prediction method corresponding to the class, conversion further suited to the feature of the input digital signal is performed.

Industrial Utilization

This invention can be utilized in a rate converter, a PCM decoding device or an audio signal processing device, which applies data interpolation processing to a digital signal.

The invention claimed is:

1. A digital-signal processing apparatus for converting an input digital signal, comprising:

envelope calculation means for calculating the envelope of the input digital signal;

class classification means for classifying the input digital signal into a class according to the calculated envelope; and prediction calculation means for prediction-calculating the input digital signal by a prediction method corresponding to the class to generate a digital signal converted from the input digital signal, wherein the digital signal is provided to an output device, and wherein the envelope calculation means calculates a positive envelope in a positive region of the input signal and a negative envelope in a negative region of the input signal.

2. The digital-signal processing apparatus according to claim 1, wherein the input digital signal is a digital audio signal.

3. The digital-signal processing apparatus according to claim 1, wherein the prediction calculation means uses prediction coefficients generated in advance by learning according to a desired digital signal.

4. A digital-signal processing system comprising:

at least one processor; and at least one memory, coupled to the at least one processor, the at least one memory storing a method for converting an input digital signal, the method comprising:

an envelope calculation step of calculating the envelope of the input digital signal;

a class classification step of classifying the input digital signal into a class according to the calculated envelope;

a prediction calculation step of prediction-calculating the input digital signal by a prediction method corresponding to the class to generate a digital signal converted from the input digital signal; and providing the digital signal to an output device, and wherein the envelope calculation step calculates a positive envelope in a positive region of the input signal and a negative envelope in a negative region of the input signal.

5. A digital-signal processing method according to claim 4, wherein the input digital signal is a digital audio signal.

6. A digital-signal processing method according to claim 4, wherein the prediction calculation step, prediction coefficients generated in advance by learning according to a desired digital signal are used.

7. A learning apparatus for generating prediction coefficients used by prediction calculation in a conversion processing of a digital-signal processing apparatus for converting an input digital signal, comprising:

apprentice-digital-signal generating means for generating an apprentice digital signal obtained by making a desired digital signal worse;

envelope calculation means for calculating the envelope of the apprentice digital signal;

class classification means for classifying the apprentice digital signal into a class according to the calculated envelope; and prediction-coefficient calculation means for calculating the prediction coefficients corresponding to the class according to the input digital signal and the apprentice digital signal, wherein the prediction coefficients are provided to an output device, wherein the envelope calculation means calculates a positive envelope in a positive region of the input signal and a negative envelope in a negative region of the input signal.

8. A learning apparatus according to claim 7, wherein the input digital signal is a digital audio signal.

9. A learning system comprising:

at least one processor; and at least one memory, coupled to the at least one processor, the at least one memory storing a method for generating prediction coefficients used by prediction calculation in a conversion processing of a digital-signal processing apparatus for converting an input digital signal, the method comprising:

an apprentice-digital-signal generating step of generating an apprentice digital signal obtained by making a desired digital signal worse;

an envelope calculation step of calculating the envelope of the apprentice digital signal;

a class classification step of classifying the apprentice digital signal into a class according to the calculated envelope;

a prediction-coefficient calculation step of calculating the prediction coefficients corresponding to the class according to the input digital signal and the apprentice digital signal; and providing the prediction coefficients to an output device, wherein the envelope calculation step calculates a positive envelope in a positive region of the input signal and a negative envelope in a negative region of the input signal.

10. A learning method according to claim 9, wherein the input digital signal is a digital audio signal.

11. A digital-signal processing apparatus for converting an input digital signal, comprising:

envelope calculation means for calculating the envelope of the input digital signal;

class classification means for classifying the digital signal into a class according to the calculated envelope;

envelope prediction calculation means for calculating a new envelope by a prediction method corresponding to the class;

carrier extracting means for extracting a carrier from the input digital signal; and modulation means for modulating the carrier according to the new envelope calculated by the envelope prediction calculation means to generate a new digital signal converted from the input digital signal, wherein the new digital signal is provided to an output device.

12. A digital-signal processing apparatus according to claim 11, wherein the input digital signal is a digital audio signal.

13. A digital-signal processing apparatus according to claim 11, wherein the envelope prediction calculation means uses prediction coefficients generated in advance by learning according to a desired digital signal.

14. A digital-signal processing system comprising:

at least one processor; and at least one memory, coupled to the at least one processor, the at least one memory storing a method for converting an input digital signal, the method comprising:

an envelope calculation step of calculating the envelope of the input digital signal;

a class classification step of classifying the digital signal into a class according to the calculated envelope;

an envelope prediction calculation step of calculating a new envelope by a prediction method corresponding to the class;

a step of extracting a carrier from the input digital signal;

a step of modulating the carrier according to the new envelope calculated in the envelope prediction calculation step to generate a new digital signal converted from the input digital signal; and providing the new digital signal to an output device.

15. A digital-signal processing method according to claim 14, wherein the input digital signal is a digital audio signal.

16. A digital-signal processing method according to claim 14, wherein in the envelope prediction calculation step, prediction coefficients generated in advance by learning according to a desired digital signal are used.

17. A learning apparatus for generating prediction coefficients used by prediction calculation in a conversion processing of a digital-signal processing apparatus for converting an input digital signal, comprising:

apprentice-digital-signal generating means for generating an apprentice digital signal obtained by making a desired digital signal worse;

first envelope calculation means for calculating the envelope of the apprentice digital signal;

class classification means for classifying the apprentice digital signal into a class according to the calculated envelope;

second envelope calculation means for calculating the envelope of the input digital signal; and prediction-coefficient calculation means for calculating the prediction coefficients corresponding to the class according to the envelope of the apprentice digital signal, calculated by the first envelope calculation means and the envelope of the input digital signal, calculated by the second envelope calculation means, wherein the prediction coefficients are provided to an output device.

18. A learning apparatus according to claim 17, wherein the input digital signal is a digital audio signal.

19. A learning system comprising:

at least one processor; and at least one memory, coupled to the at least one processor, the at least one memory storing a method for generating prediction coefficients used by prediction calculation in a conversion processing of a digital-signal processing apparatus for converting an input digital signal, the method comprising:

an apprentice-digital-signal generating step of generating an apprentice digital signal obtained by making a desired digital signal worse;

a first envelope calculation step of calculating the envelope of the apprentice digital signal;

a class classification step of classifying the apprentice digital signal into a class according to the calculated envelope;

a second envelope calculation step of calculating the envelope of the input digital signal;

a prediction-coefficient calculation step of calculating the prediction coefficients corresponding to the class according to the calculated envelope of the apprentice digital signal and the calculated envelope of the input digital signal; and providing the predicted coefficient to an output device.

20. A learning method according to claim 19, wherein the input digital signal is a digital audio signal.

21. A program storage medium for making a digital-signal processing apparatus execute a program which is recorded on said program storage medium, the program comprises:

an envelope calculation step of calculating the envelope of an input digital signal;

a class classification step of classifying the input digital signal into a class according to the calculated envelope; and a prediction calculation step of prediction-calculating the input digital signal by a prediction method corresponding to the class to generate a digital signal converted from the input digital signal, wherein said digital signal is provided to an output device, and wherein the envelope calculation step calculates a positive envelope in a positive region of the input signal and a negative envelope in a negative region of the input signal.

22. A program storage medium for making a learning apparatus execute a program which is recorded on said program storage medium, the program comprises:

an apprentice-digital-signal generating step of generating an apprentice digital signal obtained by making a desired digital signal worse;

an envelope calculation step of calculating the envelope of the apprentice digital signal;

a class classification step of classifying the apprentice digital signal into a class according to the calculated envelope; and a prediction-coefficient calculation step of calculating the prediction coefficients corresponding to the class according to the digital signal and the apprentice digital signal, wherein the prediction coefficients are provided to an output device, wherein the envelope calculation step calculates a positive envelope in a positive region of the input signal and a negative envelope in a negative region of the input signal.

23. A program storage medium for making a digital-signal processing apparatus execute a program which is recorded on said program storage medium, the program comprises:

an envelope calculation step of calculating the envelope of an input digital signal;

a class classification step of classifying the digital signal into a class according to the calculated envelope;

an envelope prediction calculation step of calculating a new envelope by a prediction method corresponding to the class;

a carrier extracting step of extracting a carrier from the input digital signal; and a modulation step of modulating the carrier according to the new envelope calculated by the envelope prediction calculation means to generate a new digital signal converted from the input digital signal, wherein said digital signal from said storage medium is provided to an output device.

24. A program storage medium for making a learning apparatus execute a program which is recorded on said program storage medium, the program comprises:

an apprentice-digital-signal generating step of generating an apprentice digital signal obtained by making a desired digital signal worse;

an envelope calculation step of calculating the envelope of the apprentice digital signal;

a class classification step of classifying the apprentice digital signal into a class according to the calculated envelope;

a second envelope calculation step of calculating the envelope of the input digital signal; and a prediction-coefficient calculation step of calculating the prediction coefficients corresponding to the class according to the calculated envelope of the apprentice digital signal and the calculated envelope of the digital signal, wherein the prediction coefficients are provided to an output device.

* * * * *